(12) United States Patent
Trimble et al.

(10) Patent No.: US 12,520,821 B2
(45) Date of Patent: Jan. 13, 2026

(54) DRINKING APPARATUS FOR AN ANIMAL

(71) Applicant: SUREFLAP LTD, Cambridge (GB)

(72) Inventors: Simon Trimble, Cambridge (GB); Jonathan Bowen, Cambridge (GB); Jaume Fatjo Rios, Cambridge (GB); Zbigniew Marcin Bandkowski, Cambridge (GB); Paul Oxley, Cambridge (GB)

(73) Assignee: SUREFLAP LTD, Cambridge (GB)

( * ) Notice: Subject to any disclaimer, the term of this patent is extended or adjusted under 35 U.S.C. 154(b) by 193 days.

(21) Appl. No.: 18/251,714

(22) PCT Filed: Nov. 3, 2021

(86) PCT No.: PCT/EP2021/080562
§ 371 (c)(1),
(2) Date: May 4, 2023

(87) PCT Pub. No.: WO2022/096535
PCT Pub. Date: May 12, 2022

(65) Prior Publication Data
US 2023/0413782 A1 Dec. 28, 2023

(30) Foreign Application Priority Data
Nov. 4, 2020 (GB) ...................................... 2017469

(51) Int. Cl.
*A01K 7/06* (2006.01)
*A01K 7/00* (2006.01)
*A01K 11/00* (2006.01)

(52) U.S. Cl.
CPC ................ *A01K 7/06* (2013.01); *A01K 7/005* (2013.01); *A01K 11/006* (2013.01)

(58) Field of Classification Search
CPC ........... G07C 9/22; G16H 10/60; G16H 50/30
See application file for complete search history.

(56) References Cited

U.S. PATENT DOCUMENTS

| 5,297,504 A | 3/1994 | Carrico |
| 5,782,202 A | 7/1998 | Strickland |

(Continued)

FOREIGN PATENT DOCUMENTS

| CN | 102669000 A | 9/2012 |
| CN | 106719037 A | 5/2017 |

(Continued)

OTHER PUBLICATIONS

Superhydrophobic electrospun nanofibers, Journal of Materials Chemistry Avol. 1, No. 6, Jan. 1, 2013 (Jan. 1, 2013), pp. 1929-1946 XP093197713, GB—Nuraje Nurxat et al.

(Continued)

*Primary Examiner* — Rufus C Point
(74) *Attorney, Agent, or Firm* — S.J. Intellectual Property LTD.

(57) ABSTRACT

We describe a water presentation device for one or more animals e.g. a domestic animal or pet such as a cat, dog or rabbit, or an agricultural or livestock animal such as a sheep, cow or pig. The device may promote visibility of the water. The device may contain sensor(s) to detect proximity of an animal, and/or proximity in the form of an animal actually touching the water. Detection of a drinking event may trigger a variety of responses within the device, e.g.: activation of an RFID antenna, weighing of water within the basin, e.g. separable bowl, and/or communication of drinking data determined by the device to a remote location.

20 Claims, 9 Drawing Sheets

(56) References Cited

U.S. PATENT DOCUMENTS

| | | | |
|---|---|---|---|
| 6,012,481 A | 1/2000 | Lenart | |
| 6,497,197 B1 | 12/2002 | Huisma | |
| 6,904,868 B2* | 6/2005 | Block | A01K 5/0114 |
| | | | 119/57.92 |
| 6,941,891 B2 | 9/2005 | van den Berg | |
| 7,380,518 B2 | 6/2008 | Kates | |
| 7,409,924 B2 | 8/2008 | Kates | |
| 8,797,166 B2 | 8/2014 | Triener | |
| 9,149,022 B2 | 10/2015 | Triener | |
| 9,420,766 B2 | 8/2016 | Triener | |
| 10,104,871 B2 | 10/2018 | Triener | |
| 10,194,637 B2 | 2/2019 | Armstrong | |
| 10,352,759 B1 | 7/2019 | Jensen | |
| 2004/0059466 A1* | 3/2004 | Block | A01K 5/0291 |
| | | | 700/240 |
| 2005/0279287 A1 | 12/2005 | Kroeker | |
| 2006/0011144 A1* | 1/2006 | Kates | G01S 15/86 |
| | | | 119/859 |
| 2010/0175625 A1 | 7/2010 | Klenotiz | |
| 2012/0299731 A1 | 11/2012 | Triener | |
| 2016/0366858 A1* | 12/2016 | Seltzer | A01K 29/005 |
| 2017/0258039 A1 | 9/2017 | Lauterbach | |
| 2019/0216050 A1 | 7/2019 | Gevaert | |
| 2020/0205381 A1 | 7/2020 | Wernimont et al. | |
| 2022/0155901 A1* | 5/2022 | Osawa | G06F 3/04144 |
| 2023/0000058 A1* | 1/2023 | Baker | A01K 5/02 |

FOREIGN PATENT DOCUMENTS

| | | |
|---|---|---|
| CN | 207574273 U | 7/2018 |
| CN | 207978662 U | 10/2018 |
| CN | 109937904 A | 6/2019 |
| CN | 211631322 U | 10/2020 |
| CN | 211832336 U | 11/2020 |
| DE | 19826348 A1 | 1/1999 |
| EP | 3656212 A1 | 5/2020 |
| ES | 1080579 U | 5/2013 |
| ES | 1080579 Y | 8/2013 |
| GB | 2554636 A | 4/2018 |
| WO | 2012/166662 A1 | 12/2012 |
| WO | 2017149049 A1 | 9/2017 |
| WO | 2019/175666 A2 | 9/2019 |
| WO | 2020022543 A1 | 1/2020 |
| WO | 2020060248 A1 | 3/2020 |
| WO | 2020/139652 A1 | 7/2020 |

OTHER PUBLICATIONS

International Tables of the Surface Tension of Water, J. Phys. Chem. Ref. Data, vol. 12, No. 3, 1983, Jul. 1, 1983 (Jul. 1, 1983), pp. 817-820, XP093197328—Vargaftik N. B. et al.

STMicroelectronics application note AN5105; 2023 STMicroelectronics, AN5105—Rev 3—Jan. 2023, www.st.com, Downloadable from https://www.st.com/resource/en/application_note/dm00445657-getting-started-with-touch-sensing-control-on-stm32-microcontrollers-stmicroelectronics.pdf.

* cited by examiner

S512 — Determine that a new signal may be indicative of a new background environment

S514 — Determine a narrow confidence interval based on the standard deviation of the signals

S516 — Determine that the new signals are indicative of a normal background environment, in response to determining that the signals fall within the narrow confidence interval

S518 — Allow the filter to adjust the baseline signal in response to the new background signals

Figure 5b

DRINKING APPARATUS FOR AN ANIMAL

TECHNICAL FIELD OF INVENTION

The present invention relates to drinking apparatuses for an animal, and a method for operating a drinking apparatus for an animal. In particular, the disclosure relates to apparatus for providing water to an animal such as a cat, and a sensor for detecting a drinking event.

BACKGROUND

Many animals suffer from a variety of chronic health conditions linked with dehydration. For example, cats are known to suffer from diabetes, chronic renal disease, feline lower urinary tract disease (FLUTD) and hyperthyroidism.

Causes for chronic dehydration in cats is not generally understood. Cats are selective in choosing the receptacles from which they will drink water, and in some scenarios may simply ignore water bowls, for a variety of reasons. Ensuring that domestic animals, and cats in particular, drink a sufficient amount of water to stay healthy can prove a difficult task for owners.

The ability to track an animal's feeding and drinking habits can therefore be helpful for monitoring an animal's wellbeing, and/or ensuring that the needs of an animal with a particular chronic illness is being met. However, measuring and tracking the drinking habits of individual animals provides a further challenge to owners of the animal. Such health monitoring may be of benefit to both animals with pre-existing conditions, to ensure their specific needs are met, and of benefit to healthy animals, to ensure that their wellbeing is maintained e.g. to predict, avert and/or mitigate potential health issues.

There remains a need for an improved drinking apparatus for an animal, preferably such an apparatus that provides water to an animal effectively, energy-efficiently, quietly and/or reliably, that allows reliable and/or accurate detecting and/or tracking of drinking habits of an animal, for example in a domestic, agricultural and/or veterinary environment, and/or has a design that is of low complexity, is ergonomic (e.g., less obstructive to drinking) and/or easily cleanable. Alternative and/or additional advantages will be apparent from the following disclosure.

For use in understanding the present invention, the following disclosures are referred to: DE19826348A1; US20050279287A1; US20100175625A1; WO2017149049A1; US2017258039A1; GB2554636A; U.S. Pat. Nos. 7,380,518; 7,409,924; 6,497,197; 6,941,891; 8,797,166; 9,149; 9,420,766; 10,104,871; 10,194,637; 10,352,759; CN106719037A; WO2020060248A1; CN109937904A; STMicroelectronics application note AN5105, downloadable from https://www.st.com/resource/en/application_note/dm00445657-getting-started-with-touch-sensing-control-on-stm32-microcontrollers-stmicroelectronics.pdf.

SUMMARY

According to a first aspect of the present invention, there is provided a drinking apparatus for an animal, comprising: a basin for holding water; a capacitive touch sensor comprising a sense electrode disposed underneath the basin; and a processor coupled to the capacitive touch sensor and configured to determine a capacitance value of capacitance coupled to the sense electrode, wherein the processor is configured to detect touching by an animal of the water held by the basin, said detection based on detecting a change of the capacitance to a capacitance value that exceeds a detection threshold relative to a reference capacitance value, wherein the processor is configured to determine the reference capacitance value based on an average of earlier capacitance values sensed by the capacitive touch sensor.

Advantageously, the touch detection may be treated as indicating a drinking event. The touch, e.g. by the tongue, may be momentary or more prolonged and/or repeated, e.g. where an animal drinks (generally by lapping) from the water over a period of time such as 1, 10 or more seconds. Regardless, a touch generally causes the capacitance to increase, thus allowing drinking event detection. (Any reference to herein to a drinking event may be interpreted as an event assumed to involve drinking; the event may not comprise actual drinking of the water. The assumption may be based on a detection of proximity detection by other sensor(s) additionally or alternatively to the water touch capacitive sensor, which in some arrangements may be absent).

Advantageously, because a change in capacitance due to an animal touching the water in the basin may be large compared to a change in capacitance caused by mere proximity of the animal to the basin, a touch and thus drinking event may be reliably and/or repeatably detected.

In an embodiment, the detecting the change of the capacitance comprises: detecting that the change is to a capacitance value that exceeds a said detection threshold, wherein the processor is configured to determine the detection threshold based on a measure of spread of the earlier capacitance values in addition to (e.g. summed with) the reference capacitance value. The earlier values are preferably measured during a period when no proximity of an animal, e.g. touch/drinking event, is detected.

The capacitive touch sensor may be configured to measure a said capacitance value based on a number of cycles of charge transfer from the sense electrode to a reservoir capacitor to reach a threshold voltage on the reservoir capacitor. Generally, the capacitive touch sensor may comprise at least two capacitors: a first comprising the sense electrode and water in the basin, and a second capacitor being a reservoir capacitor. The reservoir capacitor generally has a fixed capacitance, whereas the capacitance of the sense capacitor may vary depending on factors such as the nearby environment e.g. any local body. The apparatus may periodically charge the sense capacitance, which may then be fully discharged into the reservoir capacitor. This may be repeated until the reservoir capacitor reaches a charge threshold. A count of the number of repeated discharges may be indicative of the sense electrode capacitance, preferably averaged over the period of time taken to charge the reservoir capacitor to said threshold. Generally, the larger the sense capacitance, the fewer cycles required to charge the reservoir to the charge threshold, e.g. a threshold voltage. It will nevertheless be appreciated that other methods for determining capacitance may be used e.g. using a capacitive voltage divider or a capacitance-to-frequency converter.

The detection threshold may thus be a number of charge cycles. In examples where a change, e.g. increase, in capacitance is indicative of a said touch detection or drinking event, the touch detection may be determined based on a relative and/or proportional decrease in cycle count compared to a baseline or average cycle count, and/or a cycle-count change threshold.

The detection threshold determination may be based on calculating a statistical spread of a plurality of said measured capacitance values. The statistical spread may be e.g. variance or standard deviation. Thus, the detection threshold may be defined as or at least dependent on the standard deviation, or a multiple thereof, calculated from a plurality of measured sense capacitance values. Determining the threshold in this way may take account of the environment in which the apparatus is placed, and/or enable false positives of touch detection to be reduced or avoided.

An exceeding of the detection threshold by a capacitance value may be defined as when the magnitude of a change in capacitance (e.g. relative to a preceding and/or reference capacitance value) exceeds an absolute value of the detection threshold. Merely as an example, a plurality of background capacitance values may vary by 1 or 2 standard deviations, relative to their average value (e.g., the reference capacitance value). The detection threshold may be set at around 6 or 7 standard deviations to generally ensure that only actual touch of the water results in a touch detection signal. The detection threshold may be updated dynamically, periodically and/or continuously.

The apparatus may further comprise a guard electrode in the form of an electrically conducting perimeter surrounding and electrically insulated from the sense electrode. The guard electrode may shape and/or direct an electric field produced by the sense electrode, such that the electric field is more sensitive to changes of capacitance in the vicinity of the water basin and/or less sensitive to such changes in other regions. The guard electrode may be driven/charged by a same, preferably alternating, signal as the sense electrode. In some examples, the shape and/or dimensions of the sense electrode itself may be configured (for example, as a non-planar electrode) to guide or concentrate the electric field in the vicinity of the basin, with or without a guard electrode.

The reference capacitance value may be indicated by a 'baseline' value/level/signal, in turn representative of an expected base/background level of capacitance sensed by the capacitive touch sensor. In an embodiment, detection that the capacitance value exceeds the detection threshold comprises detecting that a sense capacitance indication from the capacitive touch sensor has changed to a value that differs from the reference capacitance value by an amount that is more than and/or equal to the detection threshold. Preferably, the reference value (or baseline value/signal) is determined based on capacitance value measurements obtained when the animal is not proximate, e.g. during a period when no drinking event is detected and/or during a fixed time after a drinking event detection (e.g., first or last of a distinct series of touch detections).

In embodiments, the touch detection may generally be determined by comparison of capacitance value(s) and/or a change of capacitance, to threshold value(s). The threshold value may be defined as a relative change (preferably relative to the reference capacitance value), or may be a fixed, or dynamically determined, capacitance value. A determination that a change of capacitance exceeds a threshold may comprise comparing the magnitude of said change in capacitance to threshold value(s). For example, the change may be a relative increase, or a relative decrease, compared to the reference capacitance value.

There may further be provided a drinking apparatus, preferably as described above having the capacitive touch sensor, comprising an RFID reader for reading an RFID tag of an animal in response to an animal proximity detection such as (if a capacitive touch sensor is present) a said touch detection. The RFID tag may comprise a microchip embedded in or worn by an animal. The processor, based on information read by the RFID reader, may confirm a drinking event detection by the capacitive touch sensor and/or identify which pet has drunk (preferably to link each water touch detection to a specific animal). The RFID of one or more animals could be learnt automatically in advance (e.g. using proximity detection to trigger learning the RFID of any nearby pet) or could be learnt manually (e.g. by RFID reading triggered by use of a button or other user interface). The apparatus may communicate drinking data of individual animal(s) to a remote device, e.g. server, phone, app.

Alternatively or additionally to an animal's identifier, the RFID reader may read biosensor(s) in the microchip and/or environmental sensor(s) within or remote from the apparatus. Preferably on every proximity detection, e.g. drinking event detected by the capacitive touch sensor, such sensor(s) can be read one or more times. Biosensor(s) may sense any one or more of e.g. temperature, heart rate, respiration, blood pressure, glucose. Environmental sensors may sense any one or more of e.g. room temperature, light condition, local weather. The biosensor and/or environmental data may be communicated to a remote server/database/app.

The apparatus may further be configured to operate in a first mode and a second, higher power mode, wherein the first mode inhibits operation of the RFID reader and the second mode allows operation of the RFID reader, wherein the drinking apparatus is configured to change from the first mode to the second mode in response to a said animal proximity detection. In this regard, the RFID reader may use a relatively large amount of power relative to other elements of the apparatus. In some examples, the drinking apparatus is battery operated. Regardless, it is preferable to increase efficiency of power usage of the apparatus in order to prolong battery life and/or reduce required capacity of a mains-powered power supply. Therefore, the RFID may be activated, e.g. to read RFID tag(s), in limited circumstances at least including in response to a touch detection. The activation may occur at least or only when the device indicates that an animal is proximate and/or has made contact with water in the basin. Advantageously, the lower power mode, during which the RFID reader is inhibited, may reduce or prevent unnecessary power consumption when an animal is absent.

The RFID reader may comprise a loop antenna, arranged to allow an animal to approach at least a portion of the basin to touch the held water. The antenna may be formed of turn(s) (e.g. 5 to 10 or more) of electrically conductive wire. The antenna may enable identification of an animal that is within a range of different distances or angular orientations relative to the apparatus. Thus, a loop antenna may be versatile in that it may be arranged in various orientations relative to the basin without compromising functionality of the drinking apparatus. In examples, the antenna may be oriented at a relatively shallow angle (e.g., less than around 40 degrees) relative to a (generally horizontal) plane of the basin and/or water surface. Such an angle may ensure little or no obstruction to an animal wishing to reach the basin. The loop may (albeit at an angle such as 40 deg) surround the basin, to increase reliability of the RFID reading when an animal is drinking.

There may further be provided a drinking apparatus having the basin and preferably the touch sensor and/or RFID reader, further comprising: a reservoir for storing water; and a conduit between the reservoir and the basin to convey water from the reservoir to the basin, the conduit comprising a valve configured to allow the water conveyance in response to depletion of water contained in the basin and to inhibit the conveyance when the water is replenished to a predetermined level or amount. The reservoir may store an amount of water to supply an animal for a period of, e.g.

one, two or more days. The reservoir and conduit may be arranged to automatically refill the basin upon partial or complete depletion. The conduit may be provided with passive and/or mechanical activation means that requires no electrical input. This may have the benefit(s) of being quiet (so as to reduce disturbance of an animal) and/or reducing power consumption.

According to a second aspect of the present invention there is provided a drinking apparatus, optionally as defined for the first aspect, comprising a basin to hold water and optionally a reservoir to store and replenish the held water, and comprising at least one load cell configured to measure a weight of part of the drinking apparatus including at least one of the basin including any said held water and any reservoir including any said stored water, the apparatus configured to estimate an amount (e.g. mass/weight, volume or level difference) of water consumed by an animal based on at least two said weights of the part measured at different times, wherein the at least two weights comprise a said weight measured before an animal proximity detection and a said weight measured after an animal proximity detection. The 'before' and 'after' proximity detections may be the same proximity detection, or a first and last of a distinct series of such detections. The proximity detection(s) may detect touch of water held in the basin, preferably using a capacitive touch sensor as set out above. Additionally or alternatively to measuring (preferably tracking) water consumption by an animal, the same load cell(s) may measure or track a remaining amount (mass/volume/level) of water in the basin and/or reservoir as described below. (In arrangements, such load cell(s) can be replaced or supplemented by a water level detector to determine remaining water (basin and/or reservoir) and/or water consumption, e.g. performing level determination rather than weighing as described above and below).

The or each animal proximity detection may comprise a touch detection of water held in the basin, the apparatus preferably comprising a capacitive touch sensor to detect the touch.

For example, the apparatus may use measurements of water weight before and after a drinking event and take the difference to determine and preferably report on the volume of drunk water, advantageously excluding background evaporation. Proximity detection may allow periodic wake up and measurement of weight of water when the animal is not present. This may allow weight of the water at the start of a drinking event to be inferred from these measurements rather than measured at the time of drinking. This may improve the accuracy that may otherwise be compromised by a pet starting to drink just before or during the measurement of the 'before' weight. Additionally or alternatively, capacitance values from the capacitive touch sensor may indicate start and/or end of drinking to allow identification of a weight measurement substantially immediately before drinking and/or to trigger weight measurement substantially immediately after drinking.

There may further be provided the drinking apparatus, configured to use the at least one load cell to determine at least one of an amount and rate of water evaporation from the basin based on at least two said weights of the part measured at different times during a period when an animal is absent.

Preferably, the amount, e.g., level, of water consumed is calculated against a reference amount/level of tracked water remaining, wherein the reference amount/level may be adjusted to account for a determined evaporation rate. In this regard, load cell(s) in some embodiments may be disturbed when a pet starts drinking. This may affect accuracy of an initial measurement of water (based on weight of the part including at least the basin) e.g. a starting drinking amount/ level after the pet has started drinking. When the pet has left (e.g. as indicated by proximity detection output for example based on a capacitive touch sensor) then the end remaining water can be measured, or can be taken from a next background tracking weight measure. The difference of the end remaining water to a modelled starting amount, e.g. volume, of water, can then be calculated. Such a modelled starting amount may be determined using the tracked amount of water remaining, preferably taking into account a determined evaporation rate. In embodiments, such calculation of an amount of water consumed against a reference amount/level of tracked water remaining may be provided in combination with or absent other apparatus features such as capacitive touch sensor or RFID reader. There may further be provided the drinking apparatus, configured to determine an amount of water drunk by the animal based on the estimated amount consumed and the determined amount or rate of water evaporation.

There may further be provided the drinking apparatus, configured to use the at least one load cell to determine an amount of water remaining in at least one of the reservoir and the basin, based on a predetermined reference weight of the part and a said measured weight of the part. The measured weight is preferably taken after a proximity, e.g. drinking event, detection. The load cell(s) may provide a measure of how full the reservoir is. This information may be provide to the user, e.g. a low water level alert. Periodic weight measurements may be used to detect removal and/or replacement of the reservoir or basin (e.g., bowl thereof) for refilling or cleaning, such information may similarly be provided to a user.

There may further be provided the drinking apparatus, configured to detect occurrence of a water leak or spillage from the basin or reservoir, the detection comprising: using the animal proximity sensor to determine if there is absence of an animal during a time period, the determination preferably indicated by a lack of any touch detection of water held in the basin; using the at least one load cell to determine if a change in the weight of the part during the time period exceeds a weight change threshold; and indicating occurrence of a said leak or spillage when during a time period a said change exceeds the weight change threshold and there is a said animal absence or lack of touch detection.

An embodiment may comprise the above features relating to load cell(s) with or without other features such as the capacitive touch sensor. For example, the load cell(s) may be used to determine the amount remaining in the basin and/or the amount remaining in the reservoir, preferably to inform a user for example upon remote request, regardless of any proximity detection such as any touch or drinking event detection.

It is noted that any reference herein to a load cell may generally be interpreted as a weight sensor, e.g. weighing scales. The load cell(s) are preferably disposed underneath the basin and/or integrated within the base of the apparatus. For example, the load cells may form feet of the apparatus. The total mass of water in the entire apparatus, e.g. including any water held in a reservoir, can be determined and tracked by the processor, using measurements from the load cell(s). The processor may use the cell(s) to make one or more measurement(s) (e.g., in response to a said touch detection or drinking event) to determine an amount of water removed from the basin, e.g. consumed by an animal. Similarly, the load cell may monitor continuously or at periodic intervals an amount of water in the basin and/or reservoir, to track evaporation of water from the basin. The processor may track, by means of the load cell(s), if and/or when water is added to the basin and/or reservoir, e.g. refilled manually by a user. The processor may monitor continuous/periodic measurements from the load cell(s) to adjust/calibrate for load cell(s) drift due to environmental changes, for example temperature fluctuations.

Regarding alternative arrangements of the drinking apparatus, any load cell(s) as referred to above may be replaced and/or supplemented by any other means for obtaining a measure of an amount of water, e.g, to determine an amount of water remaining (in basin and/or reservoir), consumed and/or evaporation (amount and/or rate thereof). Such means may for example comprise a water level detector and/or any one or more references to an amount/weight/mass/volume may be understood to mean a 'level' or 'level difference', e.g., a level of water remaining in the basin or a difference of water level before and after a detected drinking event.

The drinking apparatus may be configured such that at least a front inner portion of the basin has a hydrophobic surface to enable a convex surface of the water at an interface between the hydrophobic surface and the water. The hydrophobic surface may enable water to have a contact angle at the interface of between about 90 degrees and 140 degrees. The hydrophobic basin may be configured such that a said convex water surface reflects light outwards beyond at least the front inner portion of the basin such that the water contained in the basin has greater visibility to an animal.

There may further be provided the drinking apparatus, wherein the basin is formed of a hydrophobic material comprising any one or more of polypropylene, polytetrafluoroethylene and fluorinated ethylene propylene. Regardless, the basin may be coated and/or treated to provide a hydrophobic surface, and/or the inner surface material of the basin itself may provide inherent hydrophobicity. Chemical and/or plasma treatments may be applied to the basin surface to generate the hydrophobicity. The curvature promoted in a front region of water in the basin may advantageously reflect light (e.g. from a point source) in a range of directions, such that it is more likely to be visible to animals at different locations.

There may further be provided the drinking apparatus, wherein a side wall of at least a front portion of the basin, having an angle of less than about 25 degrees relative to the horizontal when the basin is placed on a horizontal surface to hold water. Side wall(s) of the basin may have a relatively shallow angle around the rim of the basin. Thus, the degree of curvature of water held in the basin may be further promoted, and/or a highly convex perimeter region of water may be provided, advantageously improving visibility as described above. In this regard, the contact angle of water relative to the surface of the basin (and thus the degree of curvature) may be dependent on the local mass of water. Therefore, shallow regions of the basin, e.g. defined by internal ridges and/or the side walls, may hold relatively small masses of water to increase the contact angle provided by a given hydrophobic surface.

There may further be provided the drinking apparatus comprising a communications interface configured to transmit data to a remote location, wherein such data may comprise any one or more of: animal identifier, preferably read by an RFID reader of the apparatus; drinking time, preferably determined based on a time of an animal proximity detection such as by a capacitive touch sensor to detect touch of water held in the basin; drinking duration, preferably determined based on at least one detection by an animal proximity sensor such as a capacitive touch sensor to detect touch of water held in the basin; drinking frequency, preferably determined based on frequency of detections by an animal proximity sensor such as a capacitive touch sensor to detect touch of water held in the basin; location of drinking, preferably based on a location associated with or a location identifier received by the apparatus: an identifier of the drinking apparatus, the identifier preferably stored in a memory of the apparatus; amount of water drunk during a drinking session or interval; amount of water remaining in the basin; amount of water remaining in a reservoir for refilling the basin; time of last reservoir re-fill, preferably determined by user input to the apparatus, detection of removal or reinstatement of the reservoir and/or detection of an above-threshold amount of water in the reservoir; ambient temperature, preferably determined by an environmental sensor of the apparatus: an indication of simultaneous drinking by multiple animals, preferably based on detection of different animal identifiers by the apparatus during a drinking event indicated by output of an animal proximity sensor.

According to a third aspect of the present invention, there is provided a drinking apparatus for an animal such as a cat, optionally as defined for the first and/or second aspect, comprising: a basin for presenting water to an animal; a reservoir for storing water; and a conduit comprising a valve, the valve configured to allow water stored in the reservoir to flow into the basin in response to depletion of an amount or a level of water contained in the basin, wherein at least a front inner portion of the basin has a hydrophobic surface to enable a convex surface of the water at an interface between the hydrophobic surface and the water. Such an apparatus may further comprise load cell(s) (and/or any other means of obtaining a measure of a remaining amount of water) to be used to determine an amount, e.g. level, of water remaining in the reservoir.

Advantageously, the convex water surface promoted by the hydrophobicity provides increased visibility of the water to a variety of agricultural and pet animals, in particular cats. A hydrophobic surface generally tends to repel water. Specifically, water on a hydrophobic surface will exhibit a high contact angle, e.g. greater than 90 degrees.

There may further be provided the drinking apparatus, wherein at least one of: the hydrophobic surface enables water to have a contact angle at the interface of between about 90 degrees and 140 degrees; and a side wall of at least a front portion of the basin has at an angle of less than about 25 degrees relative to the horizontal when the basin is placed on a horizontal surface to hold water.

According to a fourth aspect of the present invention, there is provided a method of operating a drinking apparatus for an animal, the drinking apparatus comprising a basin for holding water and a capacitive touch sensor to detect touch of the water by an animal, the method comprising: receiving a plurality of capacitance values measured by the capacitive touch sensor; calibrating a reference capacitance value based on an average of the capacitance values; calculating a statistical spread of said capacitance values; determining a detection threshold based on the statistical spread: receiving a further capacitance value measured by the capacitive touch sensor; if the further capacitance value differs from the reference capacitance value by more than the detection threshold, indicating that an animal is proximate to the drinking apparatus. The apparatus may be as defined for any one or more of the first to third aspects.

The average of the capacitance values may be a statistical average, e.g. mean, median, mode and maybe periodically or continually updated e.g. by calculation of a moving average. Regardless, each average may be calculated based on all or a subset of the preceding measured capacitance values.

There may further be provided the method, comprising measuring each of the capacitance values by charge transfer acquisition from a sense electrode of the capacitive touch sensor to a reservoir capacitor.

Advantageously, the use of the statistical spread to determine the threshold may be adjusted or calibrated to allow determination of different proximity events, and/or to vary sensitivity to different proximity events, e.g. touching the water, proximity to the water. For example, the threshold may be based on the standard deviation of a plurality of capacitance values, or a multiple thereof. The threshold may be defined with a relatively large number of standard deviations (for example, at least 6 standard deviations, or 6 sigma) to reduce the likelihood of a false positive.

For example, when the proximity event to be detected is a drinking event, the threshold may be set relatively high. In another example, the threshold may be altered, for example, to fewer than around 6 standard deviations. Thus, it may be advantageous for the sensitivity to be increased (e.g. by decreasing the threshold), such that a person or animal approaching the device can be detected, where no contact is made with the water in the basin. In such examples, mere presence of a person/animal causes a relatively smaller change in capacitance of the device, thus, the threshold may be lowered such that a relatively smaller change in capacitance (relative to the reference value) can be detected. It will however be understood that the underlying sensitivity of the device may generally be determined by the capacitance and properties of the electronic components, however the algorithm may be adjusted in order to optimise, e.g. increase or decrease, the sensitivity.

A said indication of an animal being proximate preferably indicates a drinking event wherein the animal has touched the water in the basin. Thus, the detection threshold of the device may be set higher (e.g. 6 or 7 standard deviations, calculated from the plurality of capacitance values) such that mere proximity (absent touching of the water in the basin) of a person or animal to the basin is not indicated as a touch detection. Advantageously, setting the detection threshold to a higher value may significantly reduce the likelihood of a false positive of touch detection, since in practice variation in the background capacitance is generally unlikely to reach as high as e.g. 6 or 7 standard deviations.

The average of the capacitance values may be an exponential moving average (EMA), preferably used to calculate and/or calibrate the reference value. Advantageously, this may reduce computational time and/or power for the calibration of the reference value, for example where the EMA value can be recursively updated using few mathematical operations. Further, the EMA may be calibrated (using at least one weighting coefficient) to vary the responsiveness to changes in the capacitance. The plurality of capacitance values measured by the capacitive touch sensor may define background capacitance values. Thus, the EMA may be tuned/calibrated such that variations and/or anomalies in background capacitance values, indicative of a person or animal approaching the basin, are inherently de-emphasised (e.g., given lower weighting) when calibrating the average. Consequently, the average may be maintained as indicative of a 'true' background capacitance value (which in turn may result in fewer false positive touch or proximity detections), for example because anomalous signals, such as from nearby persons or animals, may be efficiently and/or quickly filtered out by the EMA.

The method may comprise detecting a drinking pattern and indicating on the basis of the pattern any one or more of polydipsia, renal disease, diabetes, feline lower urinary tract disease and hyperthyroidism.

An embodiment may comprise any one or more of the above aspects singly or in combination, and may further comprise any one or more of the optional features of those or any other of the above aspects. Generally, according to any of the above aspects of a drinking apparatus or method, the animal may be a cat. Furthermore, throughout this disclosure, a drinking event (e.g. water touch event) detection is considered a type of proximity detection. In embodiments, any type of proximity, e.g. a drinking event, may be determined by one or more sensors, e.g. capacitive sensor (e.g. under a floor surface of the apparatus), RFID reader, time of flight optical proximity detector(s), movement detection (e.g. passive infrared (PIR) based movement detection), and/or beam interruption (e.g. using an IR beam), alone or in combination with drinking event detection using a capacitive touch sensor under the basin.

BRIEF DESCRIPTION OF THE DRAWINGS

For a better understanding of the present disclosure, reference will now be made, by way of example, to the accompanying drawings, in which:

FIG. 4 shows an example circuit for operating a capacitive touch sensor comprising a sense electrode such as that of FIG. 3a;

FIG. 5b shows example features for an algorithm used in conjunction with detecting a drinking event;

DETAILED DESCRIPTION

Figure 1:
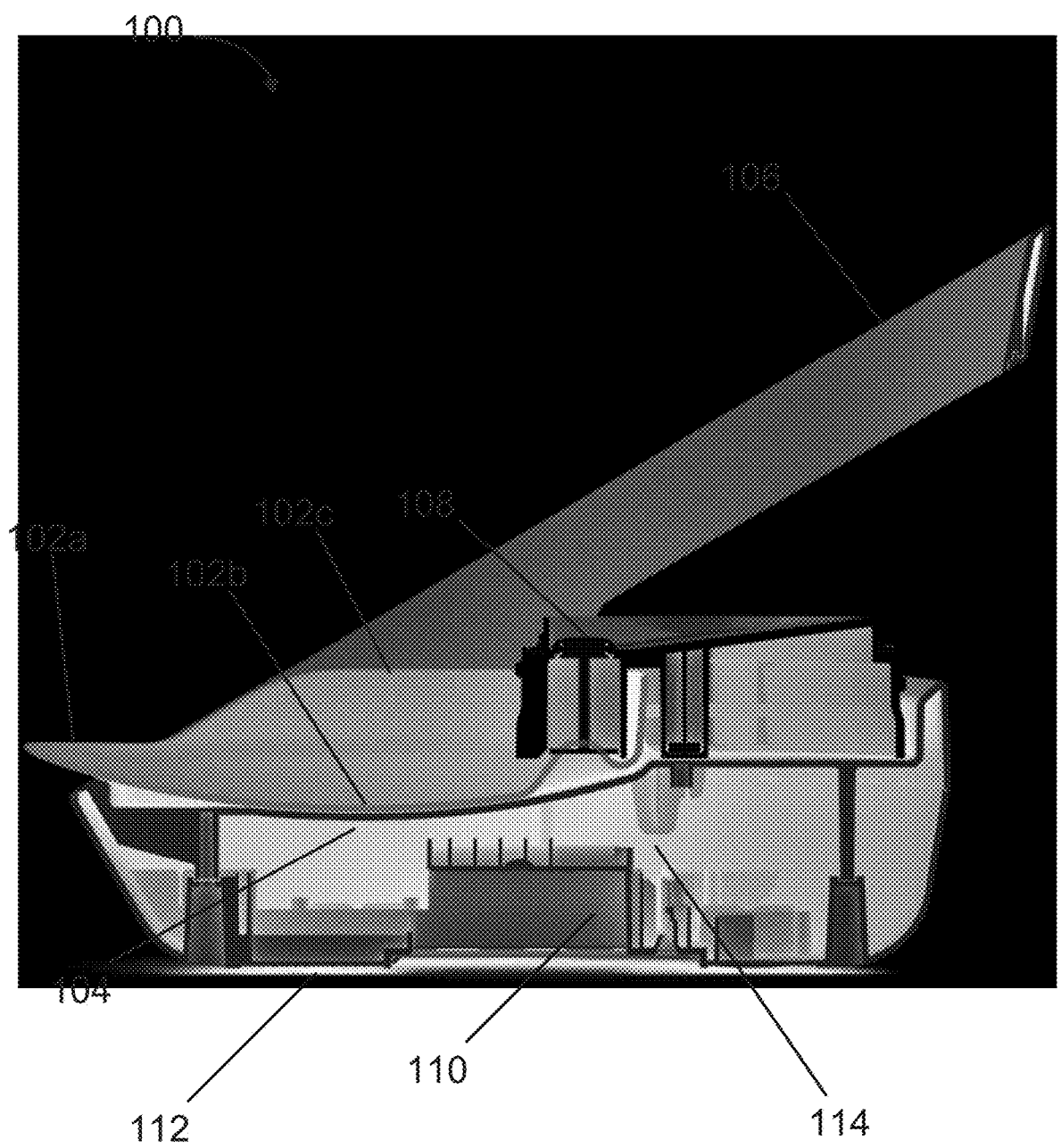
FIG. 1 shows a cross section, in profile view, of an example device comprising a water basin, valve, loop antenna housing, and housing for the touch sensor and processing circuitry.

We generally describe a water presentation device for one or more animals e.g. a domestic animal or pet such as a cat, dog or rabbit, or an agricultural or livestock animal such as a sheep, cow or pig. (Any reference herein to a pet may equally refer to any other such animal). The device may promote visibility of the water, for example to a cat generally having ability to focus at short distances e.g. ~15 cm. The device may contain sensor(s) to detect proximity of an animal, and/or proximity in the form of an animal actually touching the water. Detection of a drinking event may trigger a variety of responses within the device, e.g.: activation of an RFID antenna, weighing of water within the basin, e.g. separable bowl, and/or communication of drinking data determined by the device to a remote location. Advantageously, the device may not comprise mechanical, moving parts and thus may have increased reliability and/or be easier to clean.

Animals such as cats may prefer to drink in a manner that simulates a natural environment; this may include e.g. drinking in a location that is removed from their usual feeding location, drinking from running water, or drinking from unclean or outdoor water sources. Generally speaking, movement of the water, whether it be dripping or flowing from the tap, or movement produced by a breeze over a puddle, enhances reflections from the water's surface and can give the impression of flowing fresh water.

An embodiment disclosed herein therefore provides a means of simulating a natural environment with a clean water source, and may passively replicate a natural water environment with enhanced surface reflection. Thus, the device may obviate any need to simulate running water, which can be power-intensive. Generally, embodiments are low-power devices, and may have a local (e.g., battery) power supply. Such a device may meet the needs of different groups of people: a) reactive pet owner, wishing to meet the needs of pets with pre-existing health conditions, and/or monitor a pet's ongoing health preferably linked to a treatment for a particular condition; conscientious cat owner, who simply wishes to provide their pets (healthy or otherwise) with the best possible care, e.g. for preventative purposes—In other words, an owner who wishes to provide an optimal quality of life, specifically by ensuring that their pet, e.g., cat stays hydrated; veterinary professionals wishing to record information on the drinking habits of an animal, and advise accordingly for groups a) and b). For example, an embodiment may enable a veterinary professional to reliably and/or precisely monitor the drinking habits of a cat receiving an ongoing treatment.

A preferred embodiment comprises a water basin, underneath which is disposed a capacitive touch sensor for detecting animal proximity at least in the form of a drinking event. The basin may be configured such that the held water exhibits a high contact angle with the basin's inner surface. Contact angle may be defined as an angle between the liquid and a solid where the liquid-vapour interface meets a surface of the solid. A high contact angle may be achieved by a basin constructed of hydrophobic material (e.g., polypropylene), having a hydrophobic coating such as Polytetrafluoroethylene (PTFE), and/or having a hydrophobic surface finish (e.g. produced by polishing or roughening the surface). Generally, a hydrophobic material may be defined as providing a contact angle of greater than 90 degrees, in embodiments preferably resulting in a contact angle of ~90-140 degrees for 1-10 µL of water. Materials comprising natural oils may be hydrophobic, e.g. PLC (ABS food grade/bio equivalent). Additionally or alternatively to a hydrophobic material or coating, a smooth or polished basin surface, e.g. <0.1 mm variation, may be preferred as this may reduce wetting.

An embodiment may comprise an RFID reader for detecting a microchip embedded in or worn by an animal, preferably to thereby identify the animal. (The RFID reader may also detect animal proximity, however this may be less preferred compared to other types of proximity sensor due to high power consumption of an RFID reader). The RFID reader may comprise an antenna integral to a housing of the apparatus/device. The RFID reader may identify a particular pet that is drinking from the device. Processing means, preferably comprised within the device, may then link drinking data measured by the device to the pet identified by the RFID reader. The device may comprise communication means (preferably wireless means, e.g. Wi-Fi, Bluetooth, NFC, LoRa, LTEM and the like) capable of transmitting data such as any measured drinking data and/or environmental data recorded by the device to a remote device (such as a computer server), user device (e.g., mobile phone or tablet), and/or web-based service device. This may allow owners to monitor, preferably in substantially real-time, the drinking habits of their pets. The data may be viewed, for example, in an app on a user device, on a web-based service, or any other suitable electronic means of retrieving and viewing information.

A preferred embodiment contains a removable and/or re-fillable water reservoir. The reservoir may automatically refill the basin upon depletion of water held in the basin. The automatic refilling is preferably achieved by gravity, and thus occurs passively (absent electrical input). Alternatively, the refilling may be powered by a local and/or integral power supply (e.g., batteries). Thus, portability of the device may be improved relative to embodiments using mains power.

Generally, embodiments provide a reliable and/or precise means of monitoring an animal's drinking habits. This may be achieved using a above-mentioned capacitive touch sensor, which may be sensitive enough to detect mere proximity of an animal, and/or proximity in the form of an animal touching water in the basin. Sensitivity may be directly related to the size of a sense electrode under the basin, therefore preferably the size of the sense electrode is maximised within the device. For example, embodiments may detect water touch by an animal weighing >~20 g. An algorithm executed by processing means (preferably within the device) may enable detection of physical contact (e.g., by the animal's tongue) with water in the basin, based on analysis of measurements by the capacitive touch sensor.

The device and associated algorithm(s) generally reduce or avoid false positives, e.g. due to mere water disturbance or water re-filling. As described below, sensitivity of the capacitive touch sensor may distinguish reliably between an animal making contact with the water and non-contact events that may otherwise influence the capacitance of the sensor (e.g., an animal or human moving near the device, or other electrical disturbance).

A proximity sensor such as the capacitive touch sensor may be configured to activate the RFID reader. Such a reader may comprise an integral loop antenna, which may generally surround the basin. The RFID reader may read an animal's microchip, preferably to identify the animal. In this way, a drinking event may be associated with a particular animal. In example arrangements, the capacitive touch sensor and/or the RFID loop antenna can be configured to detect proximity of an animal, e.g. an apparatus may rely on the loop antenna to detect a drinking event merely based on proximity to an animal's microchip. Preferably, the antenna is at a shallow angle for easier animal access to the water, however this may result in RFID reading being too slow to detect the animal before the animal starts to drink. Therefore, in an embodiment the capacitive touch sensor may be the only element configured to detect proximity.

A precise amount (e.g., weight, volume and/or level difference) of water drunk, for each drinking event, may be recorded by load cells. The load cell(s) and/or other measurement means may be provided in a base of the device to measure, e.g., weigh the water remaining in the basin. The precision of such drinking measurement may be improved by using the load cells to monitor, e.g. continuously and/or periodically, background evaporation and/or refilling (e.g., manually by an owner and/or automatically by means of a reservoir of the device) of water in the basin. The change in an amount of water in the basin due to evaporation and/or refilling may thus be accounted for when determining the amount of water actually drunk by the animal. A precise value for the amount of water consumed by a pet may thus be recorded and optionally communicated to an owner by display and/or, e.g. wireless, communication to a remote device.

Embodiments are described below with the reference to the drawings. In this regard, an embodiment may comprise any feature described in relation to and/or shown in the drawings, and/or any feature described in the above summary (e.g. relating to the capacitive touch sensor, use of load cell(s)s, hydrophobic surface and/or the method for indicating that an animal is proximate) and/or under any one or more of the headings below.

FIG. 1 shows a cross-section of an embodiment of a drinking apparatus 100. The device 100 comprises the following components, which may be integral to the device: a basin (102a, 102b, 102c); a region underneath the basin where a sensor 104 (not shown) to detect drinking is preferably (i.e., optionally) disposed; a loop antenna 106 (preferably configured as part of an RFID reader) housing; a valve and/or conduit 108 for connecting the basin to a water reservoir (not shown); space 110 underneath the basin for batteries; and/or load cells 112 underlying the device. An interior 114 of the device may house electronic components, e.g. processor(s) and PCB(s).

Basin

Generally, the basin may be shaped to allow a pet easy access to the front-side of the device, and to safely contain water, e.g. by means of the raised wall 102c. The basin shape may improve visibility of the water contained in the basin. This may be achieved by using a concave basin, with sidewalls gently sloping at least along a front portion of the basin. This may ease access to, and/or improve visibility of, the water.

Figure 2A:
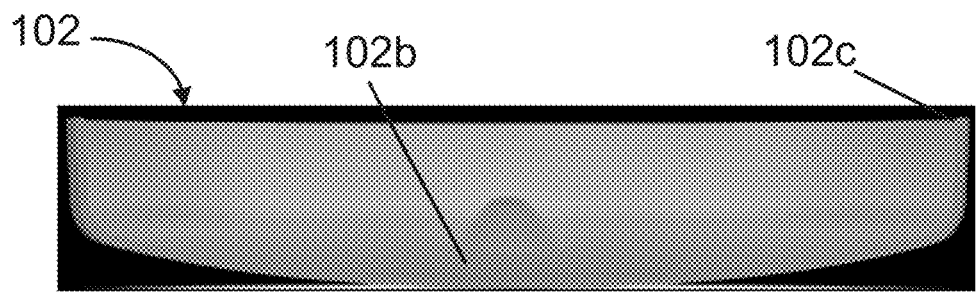
FIG. 2a shows a front view of the water basin of FIG. 1.

FIG. 2a shows an example basin, as shown in FIG. 1, wherein the front portion thereof (i.e., the left-hand side as shown) comprises a lip 102a that is raised relative to the lowest point 102b of the basin. The front-facing lip is lowered relative a vertical wall 102c that preferably surrounds a rear portion of the basin. In the shown embodiment, the angle of the slope of the front of the basin is 15 degrees to the horizontal. Indeed, preferred angles are up to about 15 degrees, most preferably about 10 degrees. More generally, the angle is preferably no more than around 25 degrees to the horizontal (and/or relative to a tangent to a central inner surface of the basin).

When animals drink, they may show a preference for specific types of drinking locations. For example, cats frequently drink from dripping taps. One reason for this preference is that a cat's vision at close range is poor. If water is not easily visible, cats generally have to rely on their whiskers. Water with a flat surface may be difficult to see. Such a water surface may act as a planar mirror, and thus reflect water only in one direction relative the location of a point light source). Additionally, where an animal such as a cat drinks water through a lapping action, they generally do not like their snouts to get covered by water. Cats are genetically programmed to seek out new water sources and so are observed drinking from puddles, pavements, and taking water from dripping or running taps. In this regard, movement of the water creates a greater degree of reflection and thus gives the impression of flowing, fresh, water. Embodiments may in effect simulate this greater reflection by means of the hydrophobic surface to promote a high contact angle/convex surface of the water, without the need to create a moving water source.

Therefore, preferably the basin of an embodiment is constructed to ensure that water held in the basin has a high contact angle at the surface of the basin.

Figure 2B:
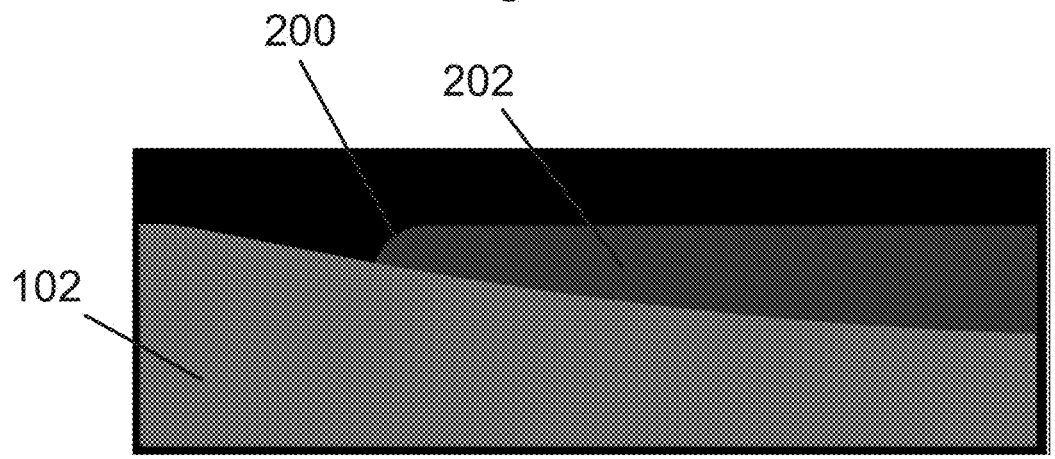
FIG. 2b illustrates a part of an example water basin of the device, and the contact angle produced by water held in the basin.

FIG. 2b illustrates a relatively high contact angle 200 of a pool of water 202 held in a basin 102 having a hydrophobic surface. The perimeter of water having such a contact angle may promote a wider range of directions of light reflection, which in turn may promote visibility of the water to animals such as cats. Regardless, in embodiments, reflection from a convex water region, preferably having a high contact angle, results in high contrast relative to neighbouring regions that do not reflect light towards the animal, and this in turn enhances visibility of the water. Similarly, it is generally preferred that the basin has a dark colour e.g. black or dark grey, or at least not white. It is further noted that a concave inner surface region of the basin where the water edge meets the basin may mean that water ripples lose less energy (e.g., relative to a basin having a substantially vertical region at the edge of the water) when they meet the basin, enabling them to be reflected back and thus enhancing water visibility to the animal. (In embodiments, this may mean that the ripples in the water propagate back and forth more than they would with a non-concave inner surface region). Additionally, increased water tension, which may be associated with high contact angle, generally decreases the wavelength of the ripples and thus increases propagation speed of ripples, thus enhancing visibility of the water. A high contact angle may further assist maintaining a sufficient depth of water for the animal to drink from, rather than this being determined entirely by the total volume of water and size of the basin with containing side boundary.

Figure 2C:
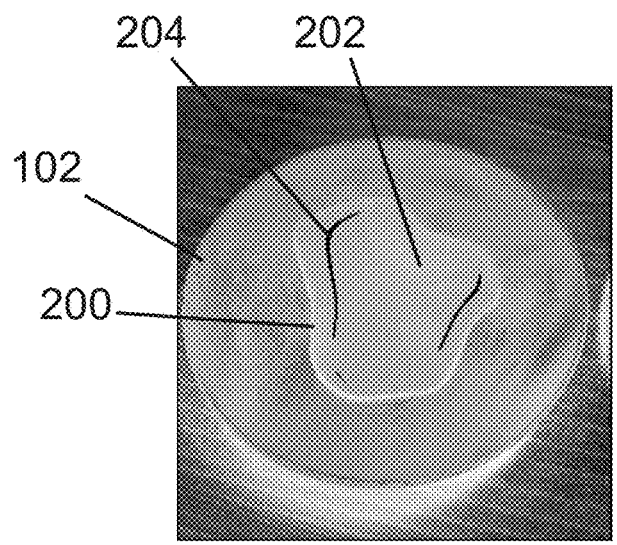
FIG. 2c shows an example of a basin having an asymmetric interior surface to produce an asymmetric shape of the water.

FIG. 2c shows an example basin 102 in the form of a basin/bowl manufactured of hydrophobic material. It can be seen that water 202 held in the basin produces a high contact angle 200 around a perimeter of the water. At least a portion of the perimeter of the water may be substantially curved and/or edge portion(s) may be convex due to the contact angle. The reflections 204 produced by cured and convex perimeter regions can readily be seen in FIG. 2c. Preferably, the internal surface of the basin shown is asymmetric, to enable such curvature to provide a more interesting and/or natural water shape for an animal.

Figure 2D:
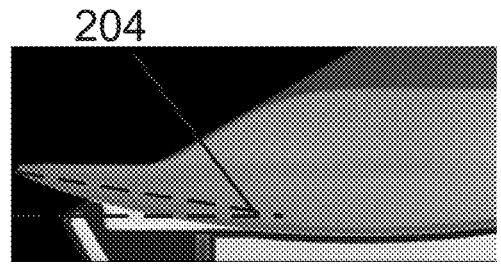
FIG. 2d shows an angle of the front portion of the basin as shown in FIG. 1.

FIG. 2d shows an enlarged view of the front portion of the basin shown in FIG. 1, where the angle between the side wall and the horizontal (disregarding any curvature of the side wall) is indicated relative to an adjacent horizontal inner surface of the basin. Preferably, the angle is less than around 25 degrees, more preferably about 15 degrees. Such an angle may result in higher value of the contact angle of water at an interface with the side wall, and/or greater convex curvature of water held in the basin.

If an observer animal (e.g. cat) moves relative to a basin such as that of FIG. 2c, they may observe the reflections 204 changing position on the water's surface. The water surface may be visible from a variety of viewing angles. Light from a single point-source may be reflected in an array of different directions due to the curvature and/or contact angle of the water, which may be promoted by the surface properties of the basin.

Thus, advantageously compared with a conventional water bowl, water held in a basin as described herein may be more visible from a range of locations and/or viewing angles. Water presented by the basin may thus appear similar to water from a dripping tap, which may be more visible due to reflections on its surface. The preference of cats for running water may alternatively be met by a water fountain that pumps water to create moving water surfaces. Such a running-water device have the disadvantage of requiring a continuous power source, and may be noisy and unreliable.

Further regarding reflections, it is noted that when water is in contact with a hydrophobic material, the water has a high contact angle with the hydrophobic surface. The water may thus form bead(s) of water. Certain plastics, such as PTFE (Polytetrafluoroethylene), FEP (Fluorinated ethylene propylene) and polypropylene, can generate a high contact angle. Such materials may possess a high surface energy that has a low affinity with water. The hydrophobic surface effect may be further enhanced by introducing fine grooves e.g. having widths of around 0.01 mm or less, in the (e.g., plastic) hydrophobic surface, and or micro or nano-structures on the surface.

The contact angle may be dependent on the mass/weight, of water; this may be due to relative influence of gravity and material surface energy. Specifically, contact angle to a surface may reduce as water mass increases, due to a balance between the water weight and the material surface energy. A droplet is generally more convex than larger pool of water. A contact angle referred may be defined, merely by way of example, relative to an angle that would be produced on a flat surface of the relevant material (e.g., hydrophobic plastic) for a given amount of water, e.g. a droplet of between ~1 to ~10 µl.

Generally, a contact angle of greater than 90 degrees is indicative of a hydrophobic surface. A material, surface coating, or surface structure capable of producing such a contact angle is preferred in embodiments of the basin described herein.

Any one or more of the following materials may be suitable basin materials: silicone (high performance); polypropylene (PP: generally effective even with surface scratches); styrene; copolyesters (e.g., Polyethylene terephthalate (PET), polyethylene terephthalate glycol-modified (PETG) and the like); polycarbonates (PC); ceramic; porcelain. Generally, any durable polymer having hydrophobic properties may be suitable. Furthermore, polymers that contain natural oils may inherently perform better.

In addition, or as an alternative to use of inherently hydrophobic material, the basin surface may be textured with a micro- and/or nanostructured surface. Such a textured surface may provide a high-surface energy that in turn provides a desired high-contact angle. For example, stainless steel (which has the benefit of high durability relative to various plastics) may be nano-textured by laser surface treatment. The resulting nano-textured surface on the steel may produce even greater contact angles than PTFE.

Further additionally or alternatively, the basin may be coated with a hydrophobic coating to enable a high contact angle. For example, the basin material, e.g., stainless steel or ceramic, may be coated with Teflon™, Liquiglide® and/or PTFE.

In addition to the above surface properties, examples of the basin may have shallow side walls, at least in a front portion of the basin, from where an animal would drink. The surface of the basin may be fully curved, however, straight side walls may be preferred as they may provide a more consistent contact angle across a greater area of the basin. Preferably, an angle of the basin sidewall to the horizontal, at least at the front of the basin, is around 10 degrees. It is further noted that, as shown in FIG. 2c, a surface of the basin may be asymmetric so as to increase the perimeter of water in the basin (relative to a uniformly shaped basin). Such asymmetry may provide even greater visibility. Generally, a variety of surface modulations, such as ridges (e.g. radiating from a central point) and/or bumps etc., may be provided on the internal surface of the basin to promote more interesting shapes of the water, thus providing curved water regions capable of reflecting light to a wider range of viewing angles. An asymmetric surface rather than e.g. ridges/bumps may however provide this effect while allowing easy cleaning of the basin. A raised shape on the internal surface of the basin, e.g. a hill preferably central to the basin, may promote a high contact angle.

Capacitive Touch Sensor

Animals such as cats have a solitary and private nature. Therefore, owners may rarely witness pets drinking in the home. This may make it difficult to gain a reliable understanding of hydration in e.g. domestic cats. An early awareness of drinking patterns may help diagnose health issues and/or reduce risks. Therefore, embodiments are provided with a sensor configured to detect when an animal e.g. cat, is drinking the water. Such detection by the sensor may trigger further mechanisms (described below) for identifying the pet and/or monitoring its health e.g. by measuring and recording drinking data.

The presence or proximity of a pet may be detected using an infrared emitter and/or a capacitive proximity sensor. A capacitive proximity sensor may comprise a capacitive sensor placed under a surface such as a floor and/or mat of the apparatus, for example to sense touch and/or proximity of an animal (e.g. paw thereof) when approaching the basin. Regarding a pet interrupting an infrared beam, positioning a beam sensor around a water basin to detect a pet may require obstructive or intrusive structures that may deter a cat from drinking. On the other hand, if an infrared sensor were disposed in a less intrusive position (e.g., away from a front portion of the basin), it may be too slow to detect a pet. Additionally, a beam may only detect the presence of a pet, i.e., cannot detect whether a pet is actually drinking. Reliability of an IR sensor may also be dependent on ambient sunlight.

It is further desirable to identify a drinking pet, however this may be power intensive and may be omitted in an embodiment. An embodiment may however comprise a means of reliably detecting when an animal is actually drinking, for example such that an RFID reader is generally activated to identify an animal only when a drinking event is taking place. Thus, any RFID reader need not be activated in response to mere pet proximity but instead in response to a drinking event detection such as based on water touch detection. Specifically, an embodiment may comprise a capacitive touch sensor that uses the basin water itself to form a sensing means capable of detecting a drinking event. Such a sensor may be unobstructive and/or have a fast response to substantially immediately detect a drinking event. An embodiment may thus provide a less complex, less obstructive, more ergonomic, accurate and/or reliable sensing mechanism.

Generally, embodiments may detect the immediate proximity. e.g. direct water touch by a tongue, paw or nose, of an animal via the detection of miniscule changes in capacitance e.g. of the order of picofarads. Such a device may be highly sensitive, even to minute changes in capacitance caused by events other than a drinking event. Capacitance measured by the capacitive drinking sensor 104 may be mutual capacitance between a sense electrode (preferably comprising at least one plane electrode e.g. electrically conductive plate) disposed underneath the basin 102, and the region above the basin itself. When the basin contains water, the mutual capacitance being measured may be between an electrode of the sensor 104 and the water 202. The sense electrode and water are capacitively coupled (the sense electrode generally not being in direct contact with the basin), such that a change in the capacitance due to touch of the water may be probed by the sense electrode.

Generally, the presence of an animal within the vicinity of the sense electrode will cause the capacitance to increase. A measurement of this capacitance may be algorithmically processed such that the proximity of an animal to the drinking apparatus can be determined or detected. It is further noted that mere presence or proximity of an animal may cause perturbations to the capacitance, whereas physical contact with the water (which may effectively cause an electrical connect between the water and animal body, and potentially the animal body and electrical ground) will generally cause a significant, e.g., sharper step change, in the capacitance. Therefore, embodiments may implement algorithm(s) to differentiate between such events, to more reliably identify when a pet has made physical contact with the water. The capacitance of the sensor may be sensitive to a variety of factors, including the local environment (e.g., floor surface, air humidity, temperature, etc.), and/or the size of an animal. Therefore, preferred algorithms dynamically adjust a detection threshold, which may be a threshold change in sense capacitance measurement or corresponding charge cycle count. Similarly, a reference capacitance value or indication thereof is preferably dynamically adjusted. Such an indication may be a baseline value such as a reference charge cycle count. Such dynamic adjustment(s) may allow an embodiment to more reliably differentiate between background noise and a drinking event.

Consistent with the above, the basin water may itself be used as a capacitive touch sensor. The system may be operated such that direct (i.e., conductive) electrical contact by an animal with the water is necessary to produce a touch detection, and this may improve the sensitivity and/or reliability of the capacitive touch sensor. Different basin sizes, shapes and/or materials may be used in conjunction with the capacitive touch sensor. Generally, any basin can be used in conjunction with the capacitive touch sensor; for example operation of the capacitive touch sensor does not require a basin having a hydrophobic or convex surface as described herein, but may be used with such a basin. Further, the algorithm may calibrate for a wide range of environmental conditions affecting capacitance, to maintain a reliable detection method even in view of different basin sizes and/or water amounts, variations in product-to-product manufacturing, type of flooring material on which the device is placed (e.g., wood, vinyl, or carpet which may create more static), and/or other factors affecting background capacitance.

Regarding dimensions, the capacitive touch sensor 104 generally contains at least one electrode, preferably formed into a plane or sheet and/or formed of a conductive material e.g. metal such as copper. Such a planar electrode e.g. rectangular in shape (e.g., ~45×80 mm), may be the sense (or probe) electrode. Sense electrodes of larger dimensions are preferable (e.g., as large as can fit in the interior 114 of the device underneath the basin), to improve the sensitivity of the electrode to changes in capacitance. Enabling larger or amplified changes in capacitance may generally lead to more reliable proximity/drinking detection.

The sensor may comprise a guard electrode (preferably grounded) surrounding the sense electrode. The guard electrode may in some embodiments reduce sensitivity of the capacitance sensing. However, parasitic capacitance and/or influence of EMI (electromagnetic interference) may be reduced. The guard electrode, which may be driven by the same signal as drives the sense electrode, may shape the electric field produced by the sense electrode to increase sensitivity of the capacitance measurement. The guard electrode may reduce electrical noise in the capacitance measurement. For example, a suitable guard electrode may improve detection distance of the device, and/or provide greater immunity to metallic objects in the vicinity of the device. The presence of the guard electrode may increase the density of the electric field in the region of the water, thus amplifying changes in capacitance due to changes in the water's environment (e.g., an animal making contact).

Figure 3A:
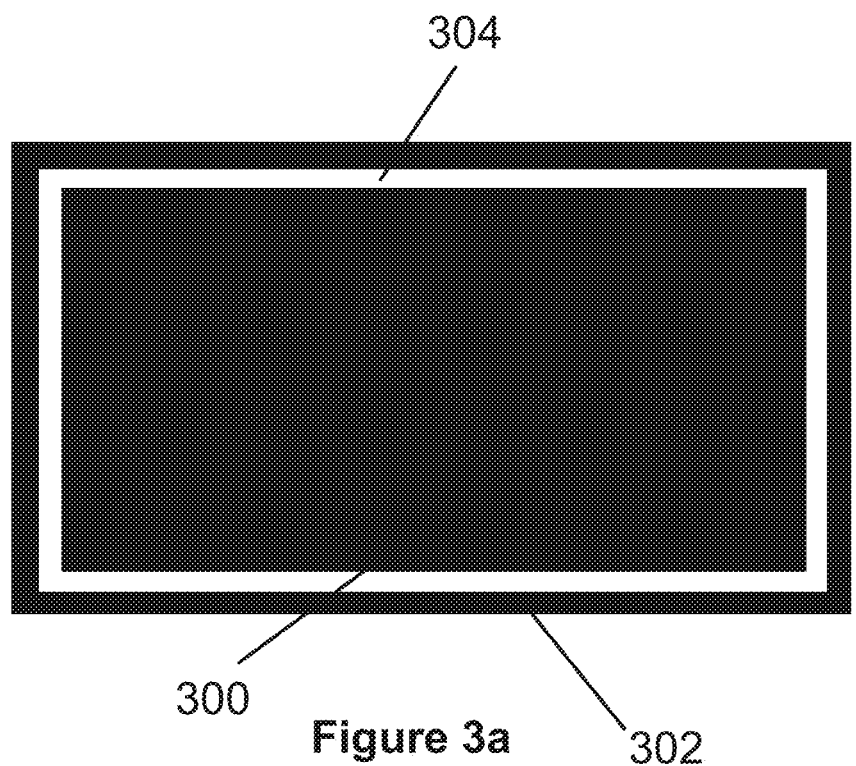
FIG. 3a illustrates a sense and guard electrode arrangement, in plan view.

FIG. 3*a* shows an example of the capacitive touch sensor 104. The sense electrode 300 preferably takes up as much area as possible within the device and under the basin, and may be surrounded by a conductive guard electrode 302. Both the sense 300 and guard 302 electrode may be formed of a thin layer copper. An area of electrically insulating material 304 interposes the sense electrode and the guard electrode, to ensure that the two electrodes do not make direct electrical contact.

Figure 3B:
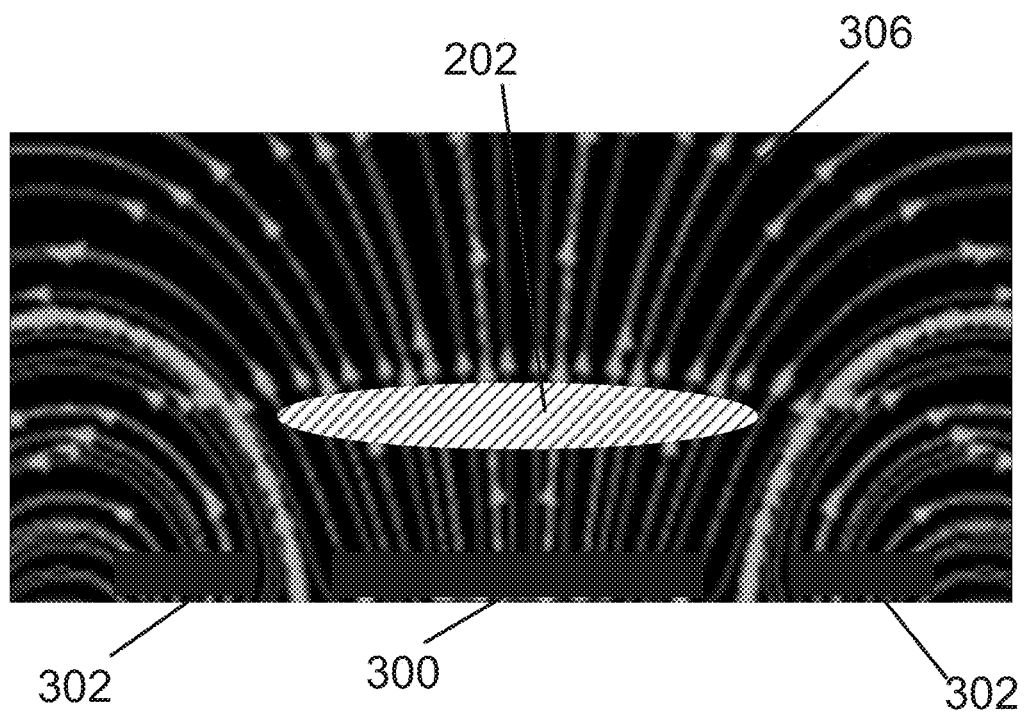
FIG. 3b illustrates an example electric field produced by a sense and guard electrode.

FIG. 3*b* shows an example electric field produced by a sensor 104 such as shown in FIG. 3*a*. The electric field lines 306 may be directed in the vicinity of the water 202, which, in embodiments such as shown in FIG. 1, may be held directly above the electrodes 300, 302. Thus, any metallic or conductive object in the vicinity of the device may have less effect on the sense capacitance.

The capacitive touch sensor may detect presence of more than one animal drinking at the same time, e.g. by detecting more than one step change of sense capacitance. Drinking data associated with such an event may be discarded or identified/labelled for the user. This may improve data quality, for example where one cat has a degraded kidney and another cat is healthy, preferably the user is clearly informed of 'true' drinking events of each animal.

Generally regarding the capacitive touch sensor, the water functions effectively as a large capacitive touch surface, preferably without needing direct electrical contact with the water. Combining this with a processing algorithm may enable a reliable and minimalistic way to detect proximity. The detection algorithm (see below) to detect when an animal touches the water may further self-calibrate and/or adjust the touch sensitivity, to account for e.g. a varying quantity of water in reservoir and/or basin, product to product manufacturing variations, environmental factors such as electrical noise and interference. A small signal, i.e., small capacitive change, may thus be detected without falsely detecting proximity.

Algorithm

Embodiments detect a drinking event by probing the changes in capacitance of the sensor 104. This may comprise mutual capacitance between the sense electrode 300 and the water 202 held in the basin. The capacitance may be measured using a mechanism based on the principle of charge transfer acquisition.

For example, firstly, a suitably large reservoir capacitor may be initialised by discharging it. The surface of the sense electrode 300 is then electrically charged by applying a voltage to it. The charge accumulated on the sense electrode 300 is then transferred to the reservoir capacitor using an electronic switch. This charge transfer sequence may be continuously repeated until the reservoir capacitor reaches a specific threshold voltage. The total number of charge transfer cycles required to reach this threshold voltage may then be used to directly infer or calculate the sense electrode's capacitance.

The algorithm may be calibrated to detect substantially only when an animal drinks from the water, taking into account that mere proximity (i.e. not necessarily involving actual touch) of an animal may increase the sense capacitance. When the sense electrode is underneath the water basin, the sense electrode will capacitively couple to the water. Thus, the combination of the sense electrode 300 and the water 202 in the basin effectively form elements of a sensing capacitor, whose capacitance will change when the water is touched by an animal. Therefore, a change e.g., relatively large and/or step change, in capacitance (or charge transfer cycles) may be detected or measured when a drinking event occurs, in contrast to other changes e.g. due to noise and/or mere (non-touch) proximity of an animal to the water's surface. (In some embodiments, the change may be detected based on a degree of change (and/or of rate of change) of a sense capacitance value, which change (e.g. decrease in charge cycle count) differs from a baseline value by at least a detection threshold change amount.

The conductivity of the water may have a further effect on the sense capacitance, and sensitivity, of the sensor. Tap water will contain impurities and various ionic salts that increase conductivity of the water, which may allow the device to operate more effectively. Highly pure water (being an electrical insulator) in principle reduces sensitivity of the device. Nevertheless, it has been observed by the inventors that even ultrapure or distilled water can be effective for sensitive capacitive touch sensing, as any salts present on a cats tongue (or even a human finger) will immediately dissolve in the water, and cause a measurable step change in the sense capacitance.

As mentioned, to help couple the sense electrode 300 to the water 202, an additional electrode guard electrode 302 (also referred to as an active shield) may be used to shape and project the electric field towards the water basin.

Embodiments may periodically repeat the above described charge transfer acquisition process to monitor sense capacitance, e.g. every 200 ms. More or less frequent and preferably periodic baseline charge cycle counts may be carried out, e.g. in response to a varying and/or above-threshold level amount of noise and/or a reduced, e.g. below threshold, battery capacity.

Figure 4:
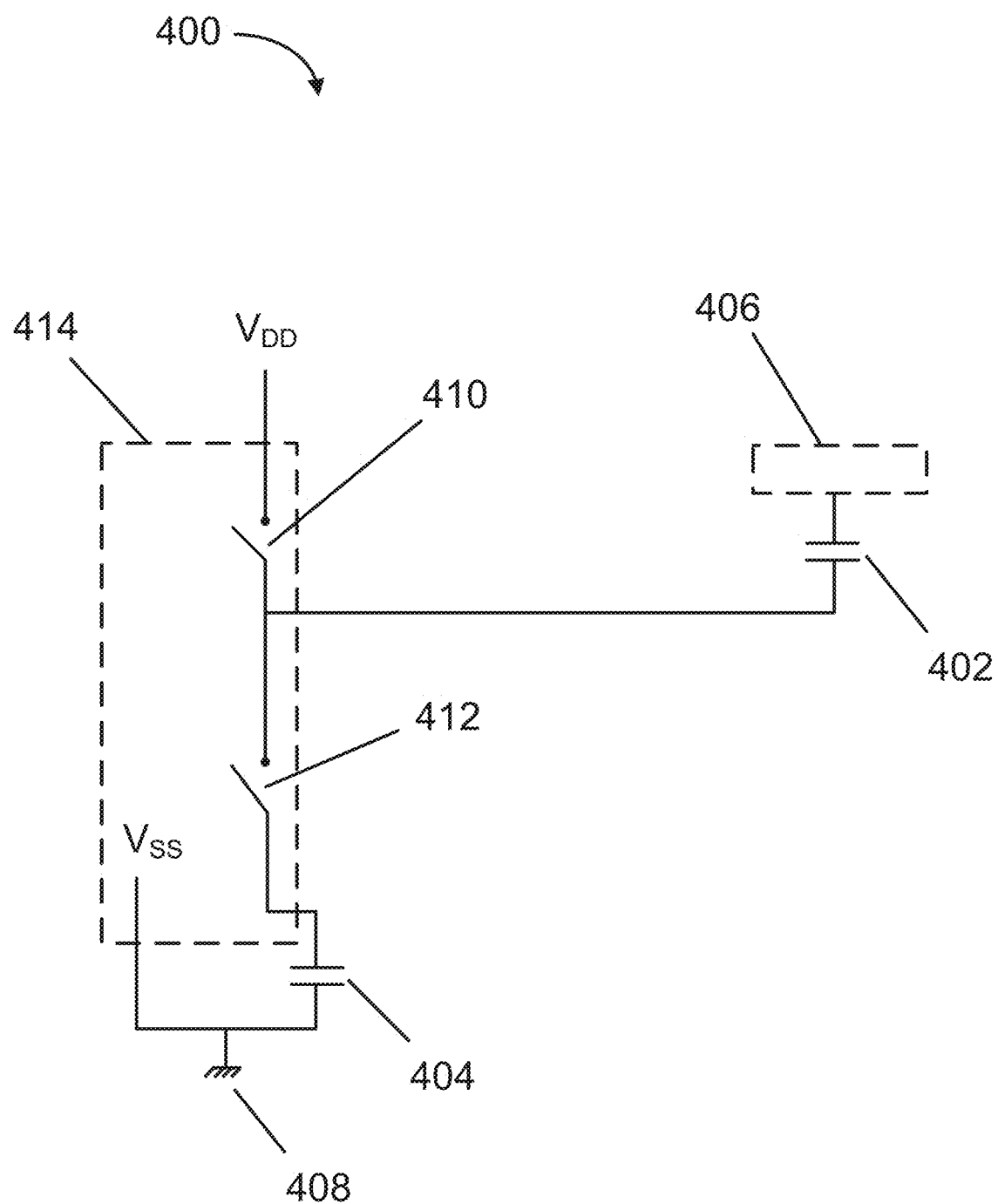

FIG. 4 shows an example circuit 400 that may be used, preferably in conjunction with an algorithm as described herein, to drive/operate the capacitive touch sensor. The circuit comprises: a sense capacitance 402/406 that in effect forms a sensor capacitor; a reservoir capacitor 404 (also referred to as a sampling capacitor); a first switch 410 (configured to charge the sense capacitance); and/or a second switch 412 (configured to discharge the sense capacitance 402 and to charge the reservoir capacitor). Ground potential is indicated as 408. Additionally, the circuit 400 may contain circuitry to discharge the reservoir capacitor 404 before each sampling period starts e.g. following each charging cycle. Such circuitry may comprise a switch (not shown) preferably coupled directly across the capacitor 404.

Generally speaking, the sense capacitance comprises capacitance of a capacitor comprising a sense electrode, the basin and any held water, and parasitic capacitance dependent on the local environment (e.g. dependent on a human and/or animal proximity to or touch of the water, furnishings such as flooring on which the apparatus is placed, and/or an amount of water in a reservoir). Element 406 represents the influence of the environment on the sense capacitance. The sense capacitance 402/406 may comprise parasitic capacitance(s), preferably including at least a parasitic capacitance between 406 and the ground potential 408.

in embodiments, the sense capacitance may be determined based on the number of cycles and known capacitance of the reservoir capacitor 404. Operation may comprise charging the sense capacitance 402/406 and transferring the accumulated charge onto the reservoir capacitor 404. This sequence may be repeated until the voltage across the reservoir capacitor reaches a threshold voltage VT. Generally speaking, when the sensor is touched, the sense capacitance is increased; this may be as a reduced or below-threshold charge transfer cycle. count In more detail, in an embodiment a first voltage $V_{DD}$ may be applied to charge the sensor capacitor 402, via operation of the first switch 410. The second switch 412 may be controlled (when switch 410 is open) to discharge the sensor capacitor 402 and thus charge the reservoir/sampling capacitor 404. Such charging and discharging may be repeated until the voltage across the reservoir capacitor 404 reaches a threshold voltage VT. The circuit 400 may use a processor such as a microcontroller 414.

Example Algorithm 1

In a straightforward example, the sensing system takes a baseline measurement (e.g., counts a number of charge cycles for the sensor capacitance to charge the reservoir capacitor) approximately every e.g. 200 ms. Such a frequency may give a good trade-off between power consumption and detection responsiveness. The count(s) may be to provide a baseline indicator (e.g. average count) of a reference capacitance value.

One method of determining whether a step change in sense capacitance has occurred is to apply a moving average filter to the last N baseline sample, to determine an average baseline count. A detection threshold may then be determined, or predetermined, e.g. as a proportion of the baseline count. If a difference between any new cycle count and the current average baseline is greater than the detection threshold, the device may indicate a touch detection.

Example Algorithm 2

As mentioned, many factors influence the absolute values of capacitance being sampled, such as product to product variations, the amount of water held in the device reservoir and basin, and/or environmental factors such as where the device is located and/or the presence of electrical noise and/or interference in the surrounding environment. The sensitivity and/or detection threshold of the sensing algorithm may be dynamically adjusted to correct for these varying parameters. Compared to algorithm 1, a more sophisticated averaging technique can be applied to improve reliability of the touch detection.

Similarly as with Algorithm 1, the sensing system may take a baseline measurement (e.g., count a number of charge cycles for the sense capacitance to charge the reservoir capacitor) approximately every, e.g. 200 ms.

A stable background reference value 'baseline' may be then calculated by passing all the periodic samples through a non-linear, preferably exponential moving average (EMA) filter. Such a non-linear filter may reduce false drinking event detections. The filter may apply a certain weighting factor to the most recent periodic sample, where the weighting value preferably decreases exponentially for successively historic periodic samples. Thus, the weighting for older sample values may decrease exponentially, though may never reach zero. An EMA value at a given time t for given series, X, of values may be defined as:

$$EMA_t = \alpha X_t + (1-\alpha) X_{t-1}$$

The coefficient $\alpha$ (a value between 0 and 1) effectively represents the responsiveness of the moving average to fluctuations in the series. Higher values of a may cause the EMA to respond more quickly to fluctuations, meaning that older observations may also be discounted at a faster rate. The value of each successive $EMA_t$, for a given new reading $X_t$, may therefore depend on the previous value of the exponential moving average.

The coefficient $\alpha$ (and/or other time-based weighting coefficients) may be fixed, determined based on environmental conditions detected by the sensor, and/or varied dynamically by the processor. For example, a may be varied dynamically based on whether an increase or a decrease, relative to the reference capacitance value, in a new capacitance value is measured. Merely for example, if the sensor detects that an animal has/is approaching (corresponding to an increased or high capacitance relative to background/reference value), a weighting factor $\alpha$ of 1/256 may be applied to that new sample. In response to a detection that an animal has moved away from the device (corresponding to a decreased or low capacitance relative to background/reference value), $\alpha$ may be set to 1/32. An asymmetry may be applied to the moving average that favours/emphasises capacitance values corresponding to an animal moving away from the device.

Generally, a different value of a may be determined for, and then applied to, each measured capacitance value. The determination of weighting factor value(s) such as a may be based on sample rate and/or desired filtering responsiveness. For example, the above example values of a may work well with a 200 ms sampling rate, and where the animal is a cat. The moving average may therefore be configured to respond differently depending on whether a higher or lower capacitance value is observed. For example, in general, if a new capacitance value reading is below the current average (corresponding to an increase in charging cycles required to charge the reservoir capacitor) then more weight may be applied to the new sample. A lower weight may be applied to a new sample whose capacitance value is above the average. Thus, the output of the EMA filter may be configured with an asymmetry with respect to the value of the input signals. (Such asymmetry may come about due to a specific decision to apply one of two or more different weighting factors (coefficient $\alpha$) to each new sample that is input into the filter. The filter time constant may then be changed on-the-fly). The filter may thus be biased in favour of 'true' background e.g. noise signals. Advantageously, this may allow the reference baseline (the value of $EMA_t$) value to more accurately track the background level, preferably allowing the average to only slowly adjust when an animal approaches but quickly recover when the animal leaves.

The background level may continuously vary over time due to e.g. temperature fluctuations, circuit voltages and other environmental variables. Therefore, filter time constants such as a may be chosen to provide a trade-off between ignoring unwanted natural circuit or environmental variations, and/or accounting for variations due to the signal of an animal's proximity. The baseline, i.e., reference, value/signal may vary depending on an amount of water in the basin. For example, the baseline may change to a new level after each drinking event (and may gradually return to a previous level once the basin refills). The algorithm may be configured to adjust to a new baseline level, e.g. byway of the above mentioned moving average filter, to account for varying amounts of water in the basin and/or reservoir.

Generally, filters other than an EMA filter may also be suitable in the algorithm. For example, any filter capable of generating a moving average value that adjusts to new signals may be suitable. Preferably, the filter provides a bias in favour of certain new signals relative to the current baseline value, e.g. such that the bias emphasises 'true' background signals in favour of signals caused by animal and/or human proximity. For example, a machine learning technique could be applied to all measured samples in order to determine a suitable baseline signal. Such a ML technique may be trained to recognise and de-emphasise (or even disregard) capacitive signals caused by human and/or animal proximity (mere proximity as opposed to actual touch), and/or random circuit fluctuations, for example.

Determination of Detection Threshold

A suitable detection threshold may be determined from the filtered baseline background average. Over a large number of samples it can be observed that the count values form a normal distribution. Therefore, the standard deviation of the samples may be calculated, and a detection threshold may be chosen for example based on a confidence interval related to the standard deviation. Such a confidence interval may be chosen to yield a sufficiently low probability of giving a false positive signal, e.g. due to random fluctuations inherent in the sample values. Sample values that exceed the threshold may safely be assumed to be due to an additional influence, such as an animal contacting the water.

The calculated standard deviation may therefore be used to determine the detection threshold. This may allow the system to automatically adjust to noise inherent within the circuitry of the device itself, and to noise due to the surrounding environment. A threshold based on a confidence interval of 6 or 7 sigma (where 1 sigma is the value of the standard deviation) is generally unlikely to yield a false positive of a drinking event (i.e., on a timescale measured in years). A threshold of around 6 or 7 sigma may provide a suitable high detection sensitivity, even where continuous noise is present in the signal. However, a threshold of 6 or 7 sigma is merely an example, and other detection thresholds based on other criteria may provide reliable detection of a drinking event.

When the detection sensitivity is kept high (e.g., using a threshold based on a confidence interval of even less than 6 sigma), presence of an animal in non-touch close proximity to the water basin may rarely exceed the threshold required to trigger the sensor. The continuous offset produced by people or animals in the vicinity of the device may only mildly affect the baseline value, and background noise may be quickly filtered out by the continuous background calibration provided by the EMA filter or other suitable filter.

When a detection event does occur due to an animal making contact with the water, this may create a series of short pulses that exceed the detection threshold. The series of pulses may be caused by a lapping action (one or more laps) against the water. Again, the asymmetric nature of some embodiments of the EMA filter as described previously may help to prevent this very repetitive and periodic signal from skewing the 'true' background baseline value.

In some examples, a hysteresis is applied to the detection threshold to reduce or prevent multiple proximity, e.g. touch/drinking, event indications being generated due to small noise fluctuations when the signal is close to the detection threshold. The threshold may be adjusted so that a large step change will always be required to trigger detection of a drinking event.

Figure 5A:
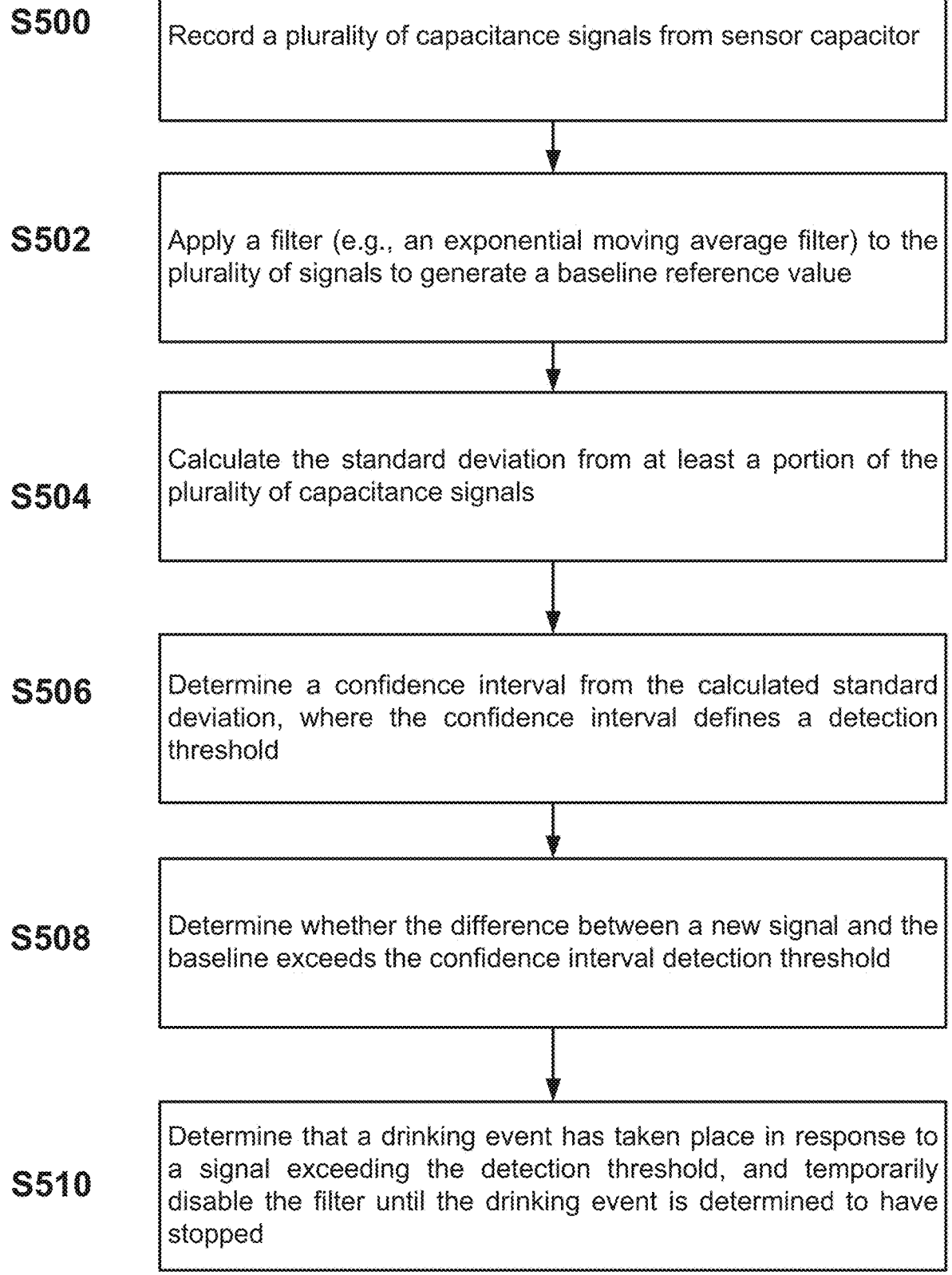
FIG. 5a shows an example algorithm for detecting a drinking event using the capacitive touch sensor.

FIG. 5a shows a flow chart of an example sensing algorithm, generally consistent with the Algorithm 2. An embodiment may implement any one or more of the steps shown and/or described below. At step S500, the capacitive touch sensor 104 measures a plurality of signals. Each signal may be a count representative of the number of charge transfer cycles required to charge a reservoir capacitor from multiple discharges of the sense capacitance (corresponding to a 'sensor capacitor' comprising capacitance coupled to e.g. sense electrode, basin, reservoir, other physical feature(s) of the apparatus such as a deck, physical environment (e.g., floor, nearby furniture, surrounding air), any held water and any associated parasitic capacitance dependent on animal absence or proximity, e.g. water touch).

In step S502, a filter is applied to the plurality of signals to determine a baseline reference value. The baseline, indicative of a reference capacitance value, may represent a typical background noise to the capacitance signal. For example, an EMA filter as described above may be used.

In step S504, the standard deviation of the plurality of signals is calculated. Generally, the signals may be distributed according to a Normal (i.e. Gaussian) distribution, thus the standard deviation may generally be an appropriate measure of spread. Some other measure of spread, for example the statistical variance, may also be suitable. As mentioned, to conserve memory in a small footprint device, the standard deviation (preferably represented by the sigma value) may be calculated based on a subset of the signal values.

In step S506, an appropriate confidence interval is determined, where the confidence interval may define the threshold that will be used to determine a drinking event. The threshold may generally be based on the standard deviation, or a multiple thereof. A confidence interval of 6 or 7 standard deviations or sigma) may provide a desired level of sensitivity and/or reliability. In general, any suitable confidence interval may be chosen that strikes a balance between having a high enough sensitivity to determine a drinking event, yet which will yield a sufficiently small probability of yielding a false positive. Smaller confidence intervals of (e.g., <6 sigma) may provide greater sensitivity, whereas larger confidence intervals (e.g., >7 sigma) may provide lower probability of yielding a false positive drinking event.

In step S508, each new signal determined by the sensor is compared to the threshold. The device may be configured to record a new signal approximately every e.g. 200 ms. The standard deviation is a measure of how much values deviate from the (mean) average value. Therefore, if the confidence interval is based on the standard deviation, the difference between a new signal and the baseline value may be compared to the value of the confidence interval to determine whether a drinking event has occurred.

According to step S510, the algorithm will determine that a drinking event (preferably due to an animal making physical contact with the water 202) is taking place when this difference (between a signal and the baseline value) exceeds the confidence interval. To preserve a baseline reference that is indicative of a background signal (and thus potentially improve reliability of the detection algorithm), the action of the baseline filter may be temporarily disabled during a drinking event.

Stabilisation of Baseline

It is preferable that the standard deviation be calculated over a sliding window of many hundreds of (or even more) samples. However, in some examples it may be beneficial to save memory or general compute time within a device to use only a subset of the recorded background samples. In this regard, smaller discrete samples of the standard deviation may be calculated and then passed through a second, preferably EMA, filter. This condensed method may yield a good approximation of the true standard deviation, and/or maintain the benefit that the resultant EMA filter value may be set to optimise (e.g., determine an accurate reference capacitance value, optionally by dynamically applying asymmetric weighting factors to the filter as described above) the system's response to the environment. The resulting standard deviation (and hence proximity detection threshold) may still adjust slowly to any momentary increases in the standard deviation due to animal proximity (or other temporary environmental factors) and may return to the previous baseline level quickly when 'normal' background conditions return.

When a drinking event is detected, it is desirable for the continuous stream of new samples to eventually be 'filtered out' or ignored altogether. Otherwise a valid proximity event, e.g. touch/drinking event, may eventually stop being detected. For example, if the signal due to a drinking event were treated as a normal background signal, the baseline value may gradually adjust to a new proximity baseline, and/or the standard deviation (and hence detection threshold) may increase to the point where a valid signal is considered noise. In order to mitigate for this issue of valid signal blocking, the (preferably EMA) filter(s) may be temporarily disabled when a drinking event is detected, and may be re-enabled when the drinking event or animal proximity is determined to have ceased.

However, disabling the filter(s) during a drinking event to halt the automatic baseline tracking may in embodiments create a further issue that itself can be mitigated. The device may permanently disable the EMA baseline tracking if the device begins to perceive some noise as a valid signal. For example, this may occur if the device is physically moved to a new location, such that all samples (i.e., the new background noise) consistently exceed the proximity detection threshold. In this case, the EMA filter may stay disabled, and a new baseline indicative of the new background would not be determined.

To mitigate this e.g. to account for the possibility of the device being moved to a new environment, the algorithm may optionally be configured to distinguish between a step change in the baseline due to sudden environmental changes, and a genuine proximity signal caused by an animal drinking event. The baseline may then be re-initialised to its new value only at the appropriate time when it is known, or when the algorithm has determined to a relative degree of certainty, that an animal is not the cause of the proximity detection.

Generally, an embodiment may be configured to determine whether an animal is within close proximity using the capacitive touch sensor. In one example, all samples over a short time period (for example, 10 to 20 seconds) are monitored to determine whether they remain within a relatively narrow threshold window. The standard deviation may be calculated, and it may then be determined whether the standard deviation is sufficiently small, which would indicate 'normal' background noise. For example, if an animal is near, it is likely that the animal would cause enough disturbance, even if very small, to cause the signals observed to fall outside said relatively narrow threshold window. If no animal in close proximity, generally, all samples may exhibit the 'normal' noise, and thus exhibit a relatively small standard deviation.

This narrow threshold window may again be dynamically adjusted, for example based on a confidence interval derived from the standard deviation. This confidence interval may be derived from the standard deviation determined previously (i.e., in determining the drinking event detection threshold). For example, a confidence interval of 4 or 5 sigma may work well to differentiate between 'normal' background noise and a signal due to animal proximity. Advantageously, the measurement time period may be a rolling window, thus, it can take as little as e.g. around 10 to 20 seconds for the present algorithm to automatically calibrate out step changes in the baseline sample values.

FIG. 5b shows an example of how the algorithm can be used to ensure the reliability of the baseline value. Generally, steps S512 to S518 may be employed by the algorithm when the device is moved to a new environment, where that environment alters the capacitance of the sensor and therefore changes the background signal. (However an embodiment may implement any one or more of the steps shown in FIGS. 5a and/or 5b).

In step S512, the algorithm determines that a new signal, or a plurality of new signals, deviates from the current baseline. For example, a plurality of signals may be measured over a rolling time window, for example between around 10 and 20 seconds.

At step S514, a further confidence interval is determined based on previous signal values. The new confidence interval may generally be narrower than the confidence interval used to define the drinking event threshold, and may be around 3 or 4 sigma. The narrower window is generally intended to be indicative the spread of signal values of a typical background signal (absent the proximity of an animal or human).

In step S516, the new signals values are compared to the further confidence interval. For example, the difference between each new signal value and the current baseline may be compared to the confidence interval to determine whether any new signal is unexpectedly high or low. Alternatively, the standard deviation of the new signal values may be compared to the standard deviation of the previous signal values, to determine the spread of new signals is typical of a 'normal' background. In either example, the new signals are determined to be indicative of a background signal if the spread of signals is determined to be consistent with the spread of previously measured signals.

At step S518, the algorithm enables the filter to treat the signals normally, e.g. to apply the filter according to step S502, to allow the baseline signal to adjust to a new level. For example, according to step S510, the filter may have been temporarily locked if the device perceives that a drinking event is taking place. However, if the device has merely been moved to a new environment, steps S512 to S516 may determine this, and unlock the filter to allow the baseline reference to adjust.

In examples of the algorithm, a further safeguard may be included to mitigate for the unlikely scenario in which the standard deviation value becomes corrupted, which may render the algorithm unable to automatically determine an appropriate time (e.g. when animals and/or humans are absent, preferably determined by lack of drinking events and/or mere proximity detections) to re-calibrate itself. In such scenarios, in examples where the system includes an RFID reader, the RFID reader and its associated processing system may obtain data of the last time an animal's chip was successfully scanned. If it is determined that an animal's chip has not been scanned for some time (for examples several minutes) the algorithm may infer that no animal is actually present. Thus, the algorithm may further infer that the sensor is falsely detecting proximity, e.g. drinking/water touch, and reset and/or re-calibration may be performed in order to determine a new re-calibration.

Generally, the present algorithm may contain an initialisation protocol to determine a suitable baseline (e.g., using a suitable filter such as the EMA filter described above) and/or detection threshold (e.g., based on the standard deviation of the baseline samples) the first time the device is used. Thus, generally speaking, if the algorithm ever determines that the standard deviation has become corrupted, and/or a new environment has caused the averaging filter to become permanently locked, the algorithm may be configured simply to re-perform the initialisation protocol.

RFID Antenna

Figure 6:
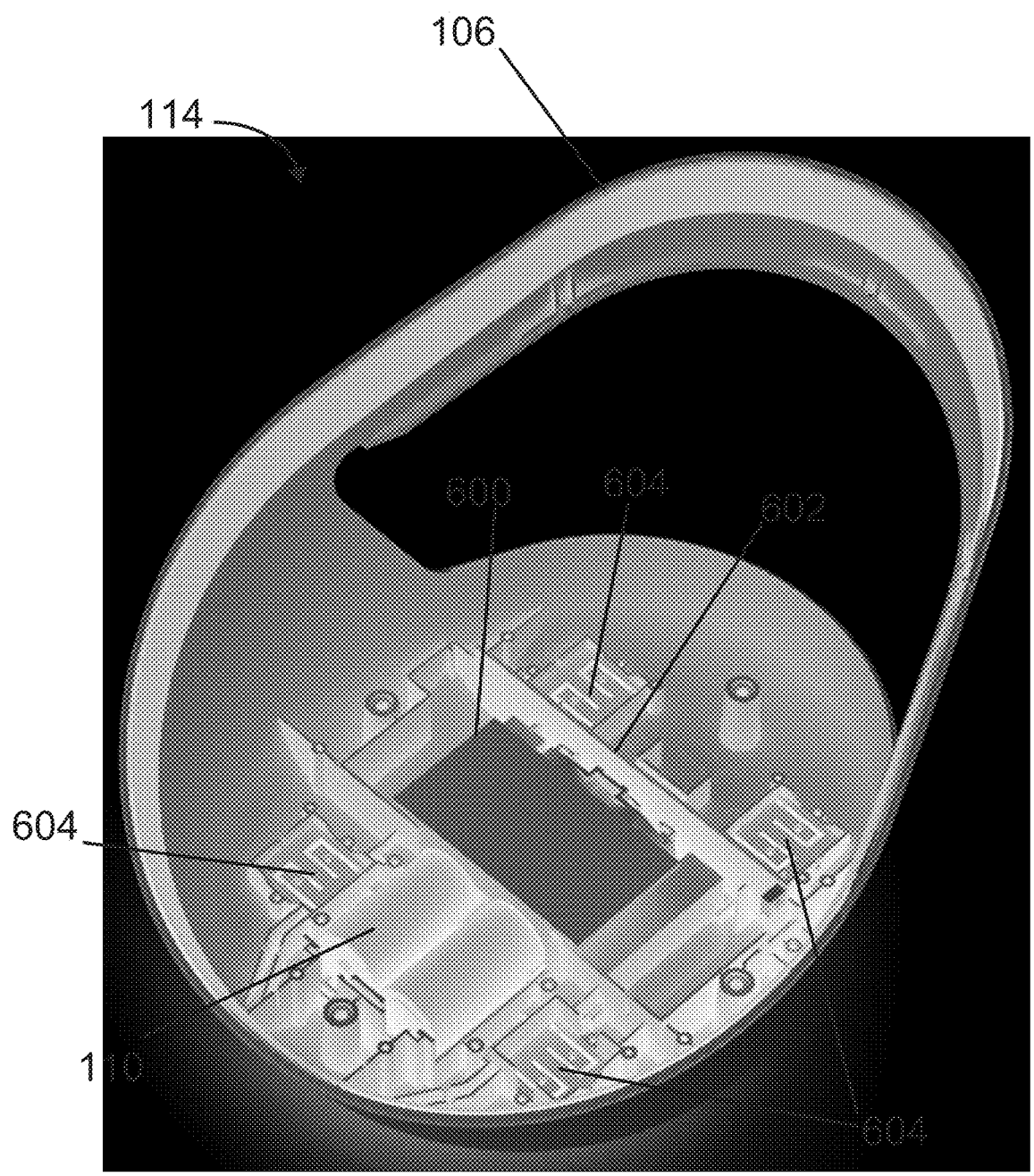
FIG. 6 shows in perspective view an interior of the device of FIG. 1, the interior underneath the basin.

FIG. 6 shows an interior 114 of the housing of a device embodiment 100. The interior 114 shown is consistent with the device of FIG. 1. The housing for the loop antenna 106 may surround the device, where coils of wire forming the antenna are generally formed around the device. The interior comprises a housing for any one or more of: batteries 110, a first printed circuit board 600 (PCB) for controlling the sensor 104, and a second PCB 602 generally for controlling other aspects of the device (e.g., the antenna 106 and/or algorithms for triggering the use of the antenna and/or recording drinking data, etc.). The housing may further comprise e.g. four load cells for weighing the device (and/or any other means of obtaining a measure of an amount, e.g., level, of water). Thus, the main PCB 602 may be configured to record a weight of the device, for example, before and after a drinking event, and/or periodically in order to monitor for example background evaporation.

It will be appreciated that other forms of the device are contemplated, for example, the device may be mains powered, for example, if use of the RFID antenna (which uses relatively more power than other components) is expected to be high. The batteries 110 may be replaceable, or integral to the device and rechargeable from a mains/external power supply.

Figure 7A:
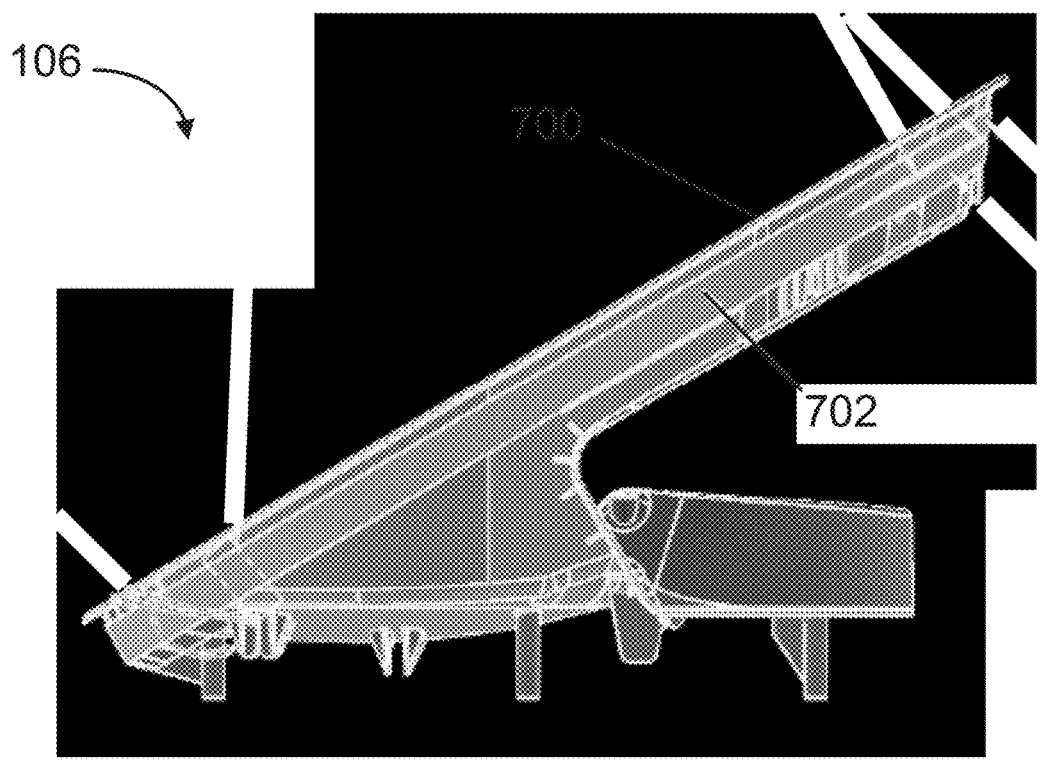
FIG. 7a shows in profile view a housing comprising a loop antenna, the housing as shown in FIG. 1.
Figure 7B:
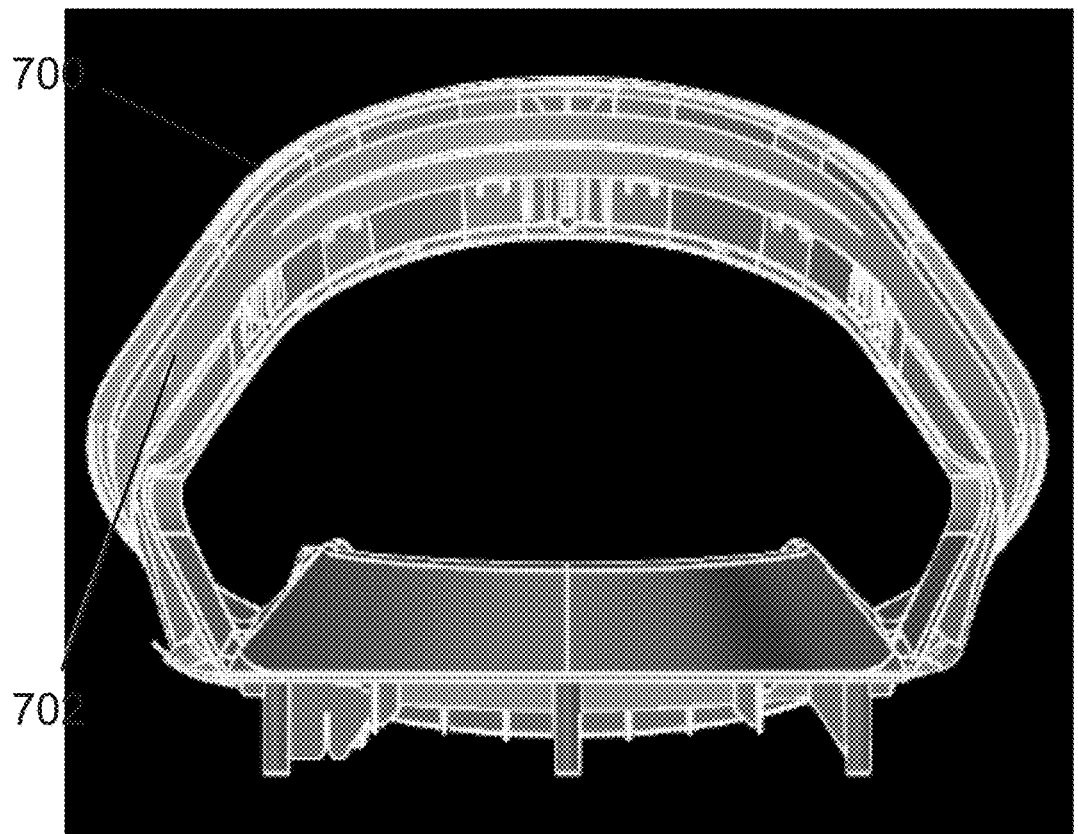
FIG. 7b shows the loop antenna housing of FIG. 7a, from a rear view perspective.

FIGS. 7a and 7b show the antenna housing of FIGS. 1 and 6 in more detail. In this example, the antenna is a loop antenna, however, any suitable antenna capable of reading an RFID tag (e.g., a microchip worn by or embedded in an animal) of an animal in proximity to the water basin would be suitable. A loop antenna 106 may be formed around an antenna frame 700, and/or may comprise a single coil of wire 702, which preferably loops around the frame 700. An example antenna comprises at least 5 or so coils of wire, however this may depend on the thickness of the wire. Around 10 or 11 coils of wire is preferred.

Any suitable conductive wire may be used to form the coil 702 for the antenna 106, e.g. copper wire (preferably insulated). Merely as an example, copper wire of around 0.6 mm in diameter can be wound 11 times around the frame 700 to form an effective loop antenna. It is preferred that the windings are taut around the frame 700, and/or that the wires are immediately adjacent, and do not overlap one another. The frequency of an RF signal to/from the loop antenna, e.g. around 130 KHz compatible with most RFID microchips, may be such that RFID detection is substantially unaffected by the present and/or amount of water in a basin or reservoir. Generally, a frequency on the order or 100s of KHz is suitable, as this may not interfere with water in the basin, reservoir, and/or present in animals.

The overall effectiveness of the loop antenna may generally be invariant to its angle. For example, the loop antenna may reliably read an RFID tag up to a distance of around e.g. 30 cm, independent of the angle of the loop. In a preferred embodiment, the loop antenna may be oriented anywhere between ~20 deg and ~90 degrees to the horizontal. Such embodiments may still reliably detect an RFID tag, again up to a distance of e.g. ~30 cm. This flexibility is advantageous, as some animals, cats in particular, can be put off by obstructions to their drinking environment. Thus, it may be desirable in some examples to provide a drinking basin providing a prominence beyond the antenna, so that the edge of the water can be seen more easily from the front and from the side.

Some animals, e.g. cats, may prefer to drink from the side of a basin (e.g. to avoid having their back to the room). Therefore, as in the embodiments shown in FIGS. 1, 6, and 7, the antenna may be oriented relatively near to the horizontal in use. This may avoid obstruction to the basin. The loop antenna as shown in the drawings has an angle of about 27 deg to the horizontal. Generally, any angle between e.g. ~20 deg to ~40 deg may still provide the above advantages of a discreet antenna.

The antenna is not required in all embodiments. Some examples comprise the capacitive touch sensor without the antenna, wherein the capacitive touch sensor is configured to detect a drinking event and preferably to trigger the recording of drinking data (e.g. by load cells and/or other means of obtaining a measure of an amount/level of water) of animals without identifying an RFID in said pet.

Low/High Power Operation Mode

As mentioned above, one or more proximity sensors such as the capacitive touch sensor may be used to activate an RFID antenna. RFID antennas generally consume more power than other components in order to use an inductance to read an RFID tag. Examples may be mains powered, however, it is preferred for the device to have its own internal power supply such that the portability and convenience is improved. Therefore, an embodiment may be configured to trigger the RFID antenna preferably only in response to a drinking event, and/or only in response to mere animal proximity, in order to conserve power.

Such an embodiment may remain in a low power mode when waiting for an animal to approach. In such a mode, substantially only the proximity sensor(s) may be running. Load cells 604 (and/or other means of obtaining a measure of an amount/level of water) may optionally run continuously (e.g. periodically wake up and detection of water weight when the animal is absent) in order to measure and/or track a remaining amount, and/or background evaporation rate, of stored and/or held water. The device may then switch to operating in a higher power in which the RFID antenna is activated. Activating the antenna only when an animal is present and/or drinking may save power compared to continual running in a high power mode. The device may be switched back into the low power mode after the RFID tag of an animal has been successfully read.

It may be of benefit to record background evaporation amount or rate of water, e.g. by activating the load cells at periodic intervals. This may be used to infer the temperature of the local environment, e.g. room temperature. This may provide more complete data to a user.

Examples of the device may repeatedly activate the RFID antenna during a drinking event, to scan the animal's microchip to ensure the same animal, or a known animal, is drinking. To conserve battery life, this repeated scan may be done periodically e.g. every few seconds rather than continually during a drinking event.

A proximity sensor(s) such as the capacitive touch sensor may then only trigger the device into a high power, antenna-activated, mode when a subsequent drinking event is determined in accordance with the above algorithm. As described above, the capacitive touch sensor may detect multiple repetitive 'drinking events', indicative of a pet touching, e.g. lapping, the water. The algorithm may infer that repeated individual laps represent a single drinking event, preferably such that the RFID reader is only activated once and/or the high power mode is disabled until it is determined that the animal is no longer present. Nevertheless, if no animal identification is required, an embodiment may not have an antenna, e.g. substantially only the capacitive touch sensor may be required. The device may thus run only in a low power mode.

Load Cells

Embodiments may comprise one or more load cells 604, as shown in FIGS. 3 and 6. Such cell(s) may be operated by, and wired to the main PCB 602, onto which circuitry is placed that determines the weight on the load cell.

When water is provided to the device its weight may be measured and stored. Before and/or after each drinking event, the water may be weighed to determine how much water has been drunk by the pet. Information describing how much food and/or water has been eaten/drunk by one or more animals may be sent to a remote device such a computer server, or directly to a local user device, or web app and the like.

However, the initial mass of water in the apparatus need not be known, and the device may simply measure a difference in mass after a drinking event, whilst further taking account of any background evaporation. For example, a load cell (s) may measure a weight of the device, or generally determine a reference weight. The weight of device can then be periodically determined to record background evaporation of water, and adjust the reference weight accordingly. It can be difficult to measure a weight of the device whilst an animal is drinking from the device, because an animal may disturb the load cells. Therefore, it is preferable to measure the weight of the device again once it is determined (e.g., by the capacitive touch sensor and/or RFID reader) that the animal has left and/or measure the weight again in the next periodic weighing. Subsequently, an accurate estimate of the water drunk by an animal can be calculated by the difference between the initial reference weight (adjusted for background evaporation) and the weight measured after the determination that an animal is no longer drinking from the device. Such information, or drinking data, may be beneficial when managing the hydration of one or more pets in the household. In combination with the RFID reader, the device may allocate each drinking event to a specific pet, therefore individual drinking data for multiple pets may be recorded and/or transmitted to a user.

The load cell(s) in combination with the processor may be used to trigger an alert indicating that the device is leaking water, e.g. because the device has been knocked over, or placed on an uneven/sloped surface. For example, the periodic background weighing (eg. to track a remaining water amount, and/or to determine a background evaporation amount/rate preferably to mitigate for the effect thereof on determination of an amount of water drunk) may be used to infer if water is leaking. For example, a leak alert may triggered in response to determining (e.g., using the capacitive touch sensor) that an animal is currently not drinking from the device and that the difference between successive periodic weight measurements is higher than expected, e.g. higher than a predetermined threshold.

The load cell(s) may similarly be configured to track a water level remaining in the reservoir. For example, the cumulative amount of water determined to have been consumed by an animal, in addition to an amount of water evaporated, can be tracked, and the device configured to raise an alert when said cumulative amount exceeds a threshold (e.g., where that threshold may be the total capacity of the reservoir, or a known amount of water added by a user).

It is noted that animal identification may be carried out by other means than RFID in any embodiment. Thus, any embodiment may lack an RFID antenna. Identification may then be carried out using other preferably wireless means e.g. Bluetooth, to read a tag worn by/embedded within an animal (e.g. a tag in/on a collar of e.g. a dog). More specifically, load cell(s) may be provided in a device with no loop antenna. The water may be weighed regardless of whether or not animal identification means is provided. In relation to pets, such an arrangement may be most suited to households with a single pet.

Drinking data recorded by the device, which may be transmitted to a remote server and/or user device, may include or more of the following: drinking time(s) (e.g. using 24 hr clock), drinking duration(s), drinking frequency, location of drinking (e.g., based on an identifier of the drinking apparatus), amount (e.g., weight or volume) of water drunk during each drinking session and/or over an interval such as a day or week. Drinking data may be used, and preferably combined with other data, to monitor hydration of a pet and thus manage a medical condition of an animal. The data may be combined with additional device data communicated to a user, e.g. water remaining in the basin and/or reservoir, time of last reservoir and/or basin re-fill. At least drinking data may be presented in the form of e.g. a histogram, to the user for example on a display of the device, website and/or a mobile phone or tablet app, covering an extended period such as a week, month or 6 months.

Based on an amount of water held in the reservoir, the device may measure an amount of water remaining in the device, and may communicate an amount of water left in the device. The device may be configured to send an alert to a user when water in the reservoir is nearly depleted, e.g. a below-threshold amount remains, and/or has not been refreshed for longer than a predefined duration e.g. 24 or 48 hours.

Drinking data may be used alone (e.g. to monitor changes of drinking habits and thus detect early stages of polydipsia and/or renal disease), and/or may be compared, preferably on a remote computing device, e.g. in the cloud, to drinking data of a population of animals of the same type, such data preferably provided from corresponding drinking apparatuses, to inform the user of abnormal drinking habits and/or health of an individual animal, for example to forewarn or diagnose health issues. For example, if a cat drinks similar amount to other cats the drinking pattern if regular and/or frequent, it may be indicated that the cat is stressed. Distinguishing between diabetes and renal disease may be made more reliable by combining drinking data with eating pattern data. Distinguishing between arthritis and renal disease may be made more reliable when pattern of eating is taken into account, preferably in combination with drinking data.

Reservoir/Valve

Figure 8A:
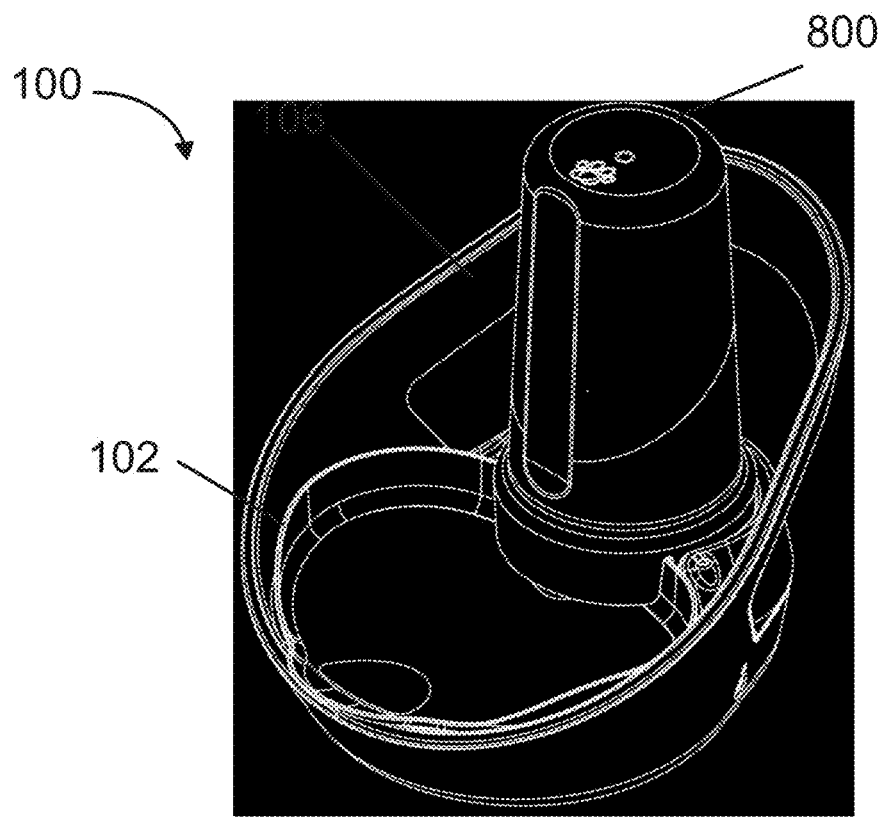
FIG. 8a shows an example device, where the basin, reservoir, and exterior of the loop antenna housing can be seen.

FIG. 8a shows an assembled embodiment (consistent with the examples of FIGS. 1, 6, and 7), where a water reservoir 800 is attached behind the basin. The shown reservoir is preferably removable such that a user can refill it with water, e.g. from a tap. However, in other examples, the reservoir may be integral such that a user refills the device in situ. Nevertheless, the removable example is preferred as it allows cleaning of the reservoir.

Figure 8B:
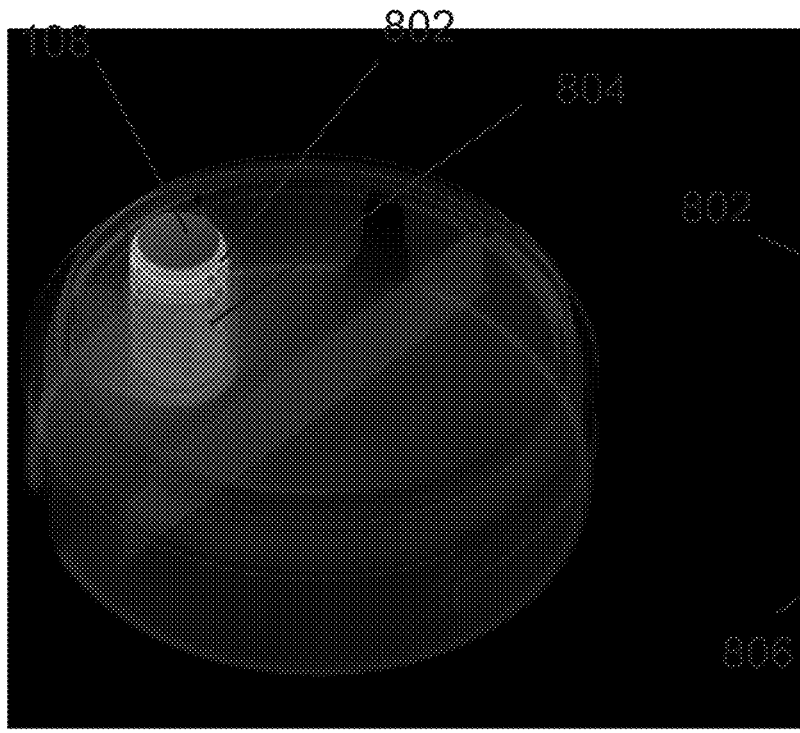
FIG. 8b shows an underside of a reservoir of a device, and an integral valve.

FIG. 8b shows an underside of the reservoir 800 (not visible in FIG. 8a), which comprises the preferably passively actuated valve 108 seen in cross-section in FIG. 1. The valve may comprise a seal 802 and a spring 804, which operate to prevent water from leaking out when the reservoir is removed. The orientation of the valve in FIG. 8b is the same as in FIG. 8a and is the preferred orientation as it would be in use. The valve may be a spring valve that operates passively to refill the basin with water when the water in the basin is depleted below a certain level. The valve is preferably configured to allow a steady flow of water into the basin that is not so fast that it risks overflowing the basin, and is not so slow that it frustrates an animal that is currently drinking.

Figure 8C:
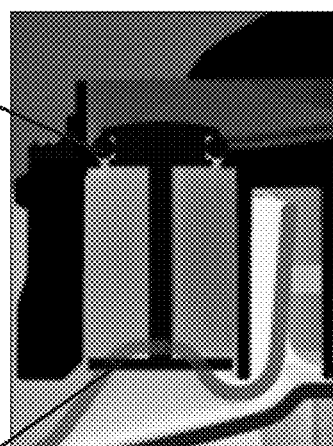
FIG. 8c shows an enlarged cross-section of the reservoir valve of FIG. 1.

FIG. 8c shows a cross section of the valve as shown in FIG. 8b, and FIG. 1. When the reservoir is removed from the device 100, the spring 804 moves a piston 806 connected to a seal 802 that covers the opening to the reservoir. Thus, the reservoir may be handled without any water leaking. When inserted into the device, the lip of the basin displaces the piston 806 and seal 802 such that water is allowed to flow through a gap (now shown) between the seal into the basin. The basin may then automatically refill due to the weight of water in the reservoir when the water in the basin is depleted.

Communications

Embodiments may include a communications interface to enable the device to communicate status information (such as local environmental information, and/or an amount of water remaining in the reservoir), and/or drinking data, to a user or remote location. For example, the interface may use any one or more of: a radio link to an internet-connected hub device, an internal WiFi device, a Bluetooth connection, a cellular connection to the internet and the like. The communications interface may provide a direct connection to the internet via a wired, Wi-Fi, or cellular connection.

Alternatively or additionally to the transmission of such data, the communications interface may enable the device to be controlled or configured. For example, a device may be remotely controlled by a user via a wireless link or via a remote site having an internet connection. For example, the communications interface may be configured to allow a user to remotely reset (e.g., re-calibrate the baseline reading) the capacitive touch sensor.

The interface may enable an end user to access the most recent information and/or drinking data via a mobile device or a website. For example, a user may request that the device send a new update of the most up-to-date drinking data. Thus, the device may be monitored remotely to assess the drinking habits and/or health of an animal.

If the device contains load cell(s) for weighing an amount of water in the basin and/or consumed by an animal, the interface may provide data based on a result of said weighing to a remote site.

Data Collection

Alternatively or additionally to the information ascertainable by the device itself (e.g., drinking data and/or animal proximity), embodiments having an RFID reader may be configured to read and record or health data from an animal's microchip. Such health may include e.g. any one or more of biometric data such as: animal temperature (e.g. read by the RFID reader from an embedded microchip), heart rate, glucose level, animal activity, and/or other physiological data.

Therefore, a communications interface on the device may transfer drinking data and/or health data ascertained from an animal to a remote site or web app etc., for example for a pet owner or veterinarian to analyse. The drinking and/or health data from the device may be combined with data from other devices, such as data from a smart feeding device indicating amount, duration or frequency of eating, and/or an activity monitor indicating an amount of physical activity of an animal, and/or with data input by a user (e.g. age, breed, lifestyle (e.g., confined to the house or mainly outdoors), diet (e.g. wet and/or dry food), medical condition of an animal; such data may be input directly to the device via a user interface, or through a remote computing device such as a mobile phone app), in order to generate a more complete health profile of an animal.

Generally, drinking and health data determined from the present device, alone or in combination with data from other smart devices, may be used in algorithms to aid diagnosis of a medical condition in an animal. Similarly, a profile of data generated from any of the above-mentioned data, alone or in combination, may be communicated to a Veterinary professional to aid in the treatment or diagnosis of a medical condition in an animal. A health profile generated from any of the above data can further be used to monitor the ongoing health of an animal.

As mentioned above, the device may determine a rate of evaporation using the load cell(s) and/or amount(s) consumed by an animal. A temperature sensor such as a thermistor coupled to the PCB 602, may indicate temperature of the environment, e.g. room temperature. If it is known that a pet is in the same environment as the drinking device, e.g. based on drinking detections, the environment temperature may be combined with any of the above drinking and/or health data to alert a user and/or improve the quality of medical advice or a diagnosis for an animal. Various medical conditions may be inferred from drinking data preferably when combined with health information as above, e.g.: diabetes, chronic renal disease, feline lower urinary tract disease (FLUTD), hyperthyroidism, and general stress.

Any one or more of the following example features may be incorporated, alone or in combination, in any embodiment such as those described herein: Load cell(s); Reservoir for re-filling of basin; Passive valve connecting reservoir to basin, and/or for allowing reservoir to re-fill basin when water in the basin is depleted; Large of multiple basin(s) allowing multiple cats to simultaneously drink from the device; RFID antenna(e); Algorithm(s) for interpreting capacitive data measured by the capacitive touch sensor; Low and high power modes, e.g. wherein a high power mode enabling operation of an RFID reader is inhibited until a drinking event and/or animal proximity is detected by a proximity sensor such as the capacitive touch sensor; Proximity sensing means (additionally to the capacitive touch sensor and/or RFID reader), for example an infrared beam to infer animal proximity (e.g. mere proximity to, rather than actual water touch) when a beam transmission or reflection ceases due to physical obstruction by an animal; and/or Communication means, wireless (e.g., WiFi, Bluetooth, radio, cellular) and/or wired.

Merely for completeness, it is noted that all references herein to "drinking" and "water" may be replaced by "eating" and "food", respectively. Food may be wet food comprising meat or fish and optionally a more liquid, e.g. semi-solid or semi-liquid, substance such as a jelly or a sauce, and/or dry food that may be grain-based, e.g. kibble.

Furthermore, it is noted that all references herein to "water" may be interpreted as encompassing any liquid for hydrating an animal, the liquid preferably comprising water, for example soup (e.g., comprising meat and/or fish) with water.

Further still, it is noted that all references herein to "drinking apparatus" may comprise a basin configured within the apparatus to hold still or moving water. For example, such still water may generally be undisturbed until touched by an animal. On the other hand, the drinking apparatus arranged to provide moving water may comprise a water pump. An example is a water fountain, eg a water fountain drinking apparatus for a cat. Regardless of whether the water is still or moving, the apparatus may have any one or more of the features of embodiments described herein, for example tracking an animal's water consumption, microchip reading, proximity (e.g. touch) detection and/or evaporation monitoring. Further yet, it is noted that any load cell(s) as referred to herein could be replaced and/or supplemented by any other means of obtaining a measure of an amount of water, e.g, to determine an amount of water remaining, consumed by an animal and/or evaporation (e.g., amount and/or rate of thereof). Such means may for example comprise a water level detector so that any one or more references to an amount/mass/weight/volume herein may be understood to mean a 'level' or 'level difference', e.g., a level of water remaining in the basin. Such a water level detector may comprise a float (e.g. magnetic or mechanical), pressure sensor, electroconductive sensor, electrostatic sensor and/or sensor (e.g., electromagnetic, ultrasonic, optical etc.) for time-of-flight to the water surface.

No doubt many other effective alternatives will occur to the skilled person. It will be understood that the invention is not limited to the described embodiments and encompasses modifications apparent to those skilled in the art lying within the scope of the claims appended hereto. It should further be noted that the invention also encompasses any combination of embodiments described herein, for example an embodiment may combine the features of any one or more of the independent and/or dependent claims.

What is claimed is:

1. A drinking apparatus for an animal, comprising:
a basin for holding water;
a capacitive touch sensor comprising a sense electrode disposed underneath the basin; and
a processing circuitry coupled to the capacitive touch sensor and configured to determine a capacitance value of capacitance coupled to the sense electrode,
wherein the processing circuitry is configured to detect touching by an animal of the water held by the basin, said detection based on detecting a change of the capacitance to a capacitance value that exceeds a detection threshold relative to a reference capacitance value, wherein the processing circuitry is configured to determine the reference capacitance value based on an average of earlier capacitance values sensed by the capacitive touch sensor.

2. The drinking apparatus of claim 1, wherein the detecting the change of the capacitance comprises:
detecting that the change is to a capacitance value that exceeds a said detection threshold, wherein the processing circuitry is configured to determine the detection threshold based on a measure of spread of the earlier capacitance values in addition to the reference capacitance value.

3. The drinking apparatus claim 1, wherein the capacitive touch sensor is configured to measure a said capacitance value based on a number of cycles of charge transfer from the sense electrode to a reservoir capacitor to reach a threshold voltage on the reservoir capacitor.

4. The drinking apparatus of claim 1, comprising:
an RFID reader for reading an RFID tag of an animal in response to an animal proximity detection such as a said touch detection.

5. The drinking apparatus of claim 4, configured to operate in a first mode and a second, high power mode, wherein the first mode inhibits operation of the RFID reader and the second mode allows operation of the RFID reader,
wherein the drinking apparatus is configured to change from the first mode to the second mode in response to a said animal proximity detection.

6. The drinking apparatus of claim 4, wherein the RFID reader comprises a loop antenna arranged to allow an animal to approach at least a portion of the basin to touch the held water.

7. The drinking apparatus of claim 1, comprising:
a reservoir for storing water; and
a conduit between the reservoir and the basin to convey water from the reservoir to the basin, the conduit comprising a valve configured to allow the water conveyance in response to depletion of water contained in the basin and to inhibit the conveyance when the water is replenished to a predetermined level or amount.

8. The drinking apparatus of claim 1, wherein at least a front inner portion of the basin has a hydrophobic surface to enable a convex surface of the water at an interface between the hydrophobic surface and the water.

9. The drinking apparatus of claim 8, wherein at least one of:
the hydrophobic surface enables water to have a contact angle at the interface of between about 90 degrees and 140 degrees; and
a said convex water surface is to reflect light outwards beyond a front portion of the basin such that the water contained in the basin has greater visibility to an animal.

10. The drinking apparatus of claim 1, wherein at least one of:
the basin is formed of a hydrophobic material comprising any one or more of polypropylene, polytetrafluoroethylene and fluorinated ethylene propylene; and a side wall of at least a front portion of the basin has at an angle of less than about 25 degrees relative to the horizontal when the basin is placed on a horizontal surface to hold water.

11. The drinking apparatus of claim 1, comprising a communications interface configured to transmit data to a remote location, wherein such data comprises any one or more of:
animal identifier;
drinking time;
drinking duration;
drinking frequency;
location of drinking;
an identifier of the drinking apparatus;
amount of water drunk during a drinking session or interval;
amount of water remaining in the basin;
amount of water remaining in a reservoir for refilling the basin;
time of last reservoir re-fill;
ambient temperature;
an indication of simultaneous drinking by multiple animals.

12. A drinking apparatus of claim 1, wherein the drinking apparatus is a drinking apparatus for a cat, comprising:
a basin for presenting water to an animal;
a reservoir for storing water; and
a conduit comprising a valve, the valve configured to allow water stored in the reservoir to flow into the basin in response to depletion of an amount or a level of water contained in the basin,
wherein at least a front inner portion of the basin has a hydrophobic surface to enable a convex surface of the water at an interface between the hydrophobic surface and the water.

13. The drinking apparatus of claim 12, wherein at least one of:
the hydrophobic surface enables water to have a contact angle at the interface of between about 90 degrees and 140 degrees; and
a side wall of at least a front portion of the basin has at an angle of less than about 25 degrees relative to the horizontal when the basin is placed on a horizontal surface to hold water.

14. A drinking apparatus for an animal, comprising:
a basin to hold water; and optionally a reservoir to store and replenish the held water, and
at least one load cell configured to measure a weight of part of the drinking apparatus including at least one of the basin including any said held water and any reservoir including any said stored water;
the apparatus configured to:
estimate an amount of water consumed by an animal based on at least two said weights of the part measured at different times, wherein the at least two weights comprise a said weight measured before an animal proximity detection and a said weight measured after an animal proximity detection; and
detect an occurrence of a water leak or spillage from the basin, the detection comprising:
using the animal proximity sensor to determine if there is absence of an animal during a time period, the determination indicated by a lack of any touch detection of water held in the basin;
using the at least one load cell to determine if a change in the weight of the part during the time period exceeds a weight change threshold; and
indicating occurrence of a said leak or spillage when during a time period a said change exceeds the weight change threshold and there is a said animal absence or lack of touch detection.

15. The drinking apparatus of claim 14, wherein the or each animal proximity detection is a touch detection of water held in the basin, the apparatus comprising a capacitive touch sensor to detect the touch.

16. The drinking apparatus of claim 14, configured to use the at least one load cell to determine at least one of an amount and rate of water evaporation from the basin based on at least two said weights of the part measured at different times during a period when an animal is absent.

17. The drinking apparatus of claim 8, wherein
the drinking apparatus is configured to use the at least one load cell to determine an amount of water remaining in at least one of the reservoir and the basin, based on a predetermined reference weight of the part and a said measured weight of the part.

18. A method of operating a drinking apparatus for an animal, the drinking apparatus comprising a basin for holding water and a capacitive touch sensor to detect touch of the water by an animal, the method comprising:
receiving a plurality of capacitance values measured by the capacitive touch sensor;
calibrating a reference capacitance value based on an average of the capacitance values;
calculating a statistical spread of said capacitance values;
determining a detection threshold based on the statistical spread;
receiving a further capacitance value measured by the capacitive touch sensor;
if the further capacitance value differs from the reference capacitance value by more than the detection threshold, indicating that an animal is proximate to the drinking apparatus.

19. The method of claim 18, comprising measuring each of the capacitance values by charge transfer acquisition from a sense electrode of the capacitive touch sensor to a reservoir capacitor.

20. The method of claim 18, wherein at least one of:
said indication of an animal being proximate indicates a drinking event wherein the animal has touched the water in the basin;
the average is an exponential moving average; and
the animal is a cat, and the method comprising detecting a drinking pattern and indicating on the basis of the pattern any one or more of polydipsia, renal disease, diabetes, feline lower urinary tract disease and hyperthyroidism.

* * * * *